(12) United States Patent
Tanabe

(10) Patent No.: US 11,546,553 B2
(45) Date of Patent: Jan. 3, 2023

(54) IMAGE CAPTURING APPARATUS USING LEARNED MODEL, INFORMATION PROCESSING APPARATUS, METHODS OF CONTROLLING RESPECTIVE APPARATUSES, LEARNED MODEL SELECTION SYSTEM, AND STORAGE MEDIUM

(71) Applicant: CANON KABUSHIKI KAISHA, Tokyo (JP)

(72) Inventor: Akihiro Tanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 271 days.

(21) Appl. No.: 17/111,852

(22) Filed: Dec. 4, 2020

(65) Prior Publication Data
US 2021/0176430 A1 Jun. 10, 2021

(30) Foreign Application Priority Data
Dec. 6, 2019 (JP) .............................. JP2019-221408

(51) Int. Cl.
*H04N 7/173* (2011.01)
*H04N 5/77* (2006.01)
*H04N 21/6377* (2011.01)
*G06N 20/00* (2019.01)

(52) U.S. Cl.
CPC ......... *H04N 7/17318* (2013.01); *G06N 20/00* (2019.01); *H04N 5/772* (2013.01); *H04N 21/6377* (2013.01)

(58) Field of Classification Search
CPC ........... H04N 7/17318; H04N 21/6377; H04N 5/772; H04N 5/77; H04N 5/765; H04N 5/23225; H04N 5/23218; H04N 5/23206; H04N 5/232933; H04N 5/2178;
(Continued)

(56) References Cited

U.S. PATENT DOCUMENTS 10,810,461 B2 * 10/2020 Sugiura ................ G06V 10/776
10,896,679 B1 * 1/2021 Hu ........................ G10L 15/063
(Continued)

FOREIGN PATENT DOCUMENTS

JP 2008-067316 A 3/2008

*Primary Examiner* — Pritham D Prabhakher
(74) *Attorney, Agent, or Firm* — Cowan, Liebowitz & Latman, P.C.

(57) ABSTRACT

An image capturing apparatus capable of replacing a learned model for performing processing on a captured image, with another, as required. The image capturing apparatus generates a captured image by capturing an image of an object, communicates with an information processing apparatus storing learned models associated with a plurality of objects of different classes, respectively, executes the processing on the captured image using a learned model associated with a high-priority object, generates history data based on at least one of the captured image and image capturing information at the image capturing time, acquires learned coefficient parameters of the learned model associated with another object from the information processing apparatus based on the generated history data, and changes settings of the learned model based on the acquired learned coefficient parameters.

28 Claims, 13 Drawing Sheets

(58) Field of Classification Search
CPC ........ H04N 9/73; G06N 3/0454; G06N 3/063;
G06N 3/08; G06N 20/00
USPC ..................................................... 348/211.3
See application file for complete search history.

(56) References Cited

U.S. PATENT DOCUMENTS

| | | | |
|---|---|---|---|
| 2009/0172754 A1* | 7/2009 | Furukawa .............. | H04N 5/765 |
| | | | 725/87 |
| 2018/0060302 A1* | 3/2018 | Liang ...................... | G06F 16/35 |
| 2019/0095757 A1* | 3/2019 | Sugiura .................. | G06N 3/084 |
| 2020/0247429 A1* | 8/2020 | Tram .................. | B60W 50/085 |
| 2021/0256823 A1* | 8/2021 | Ito ..................... | G08B 13/19613 |
| 2021/0406369 A1* | 12/2021 | Healy ...................... | G06N 5/04 |
| 2022/0168640 A1* | 6/2022 | Ida ........................ | A63F 13/533 |

* cited by examiner

IMAGE CAPTURING APPARATUS USING LEARNED MODEL, INFORMATION PROCESSING APPARATUS, METHODS OF CONTROLLING RESPECTIVE APPARATUSES, LEARNED MODEL SELECTION SYSTEM, AND STORAGE MEDIUM

BACKGROUND OF THE INVENTION

Field of the Invention

The present invention relates to an image capturing apparatus that identifies an object by a machine learning method when image capturing is performed, an information processing apparatus, a learned model selection system, a method of controlling the image capturing apparatus, a method of controlling the information processing apparatus, and a storage medium.

Description of the Related Art

There is known an image capturing apparatus that identifies an object by a machine learning method, notably. e.g. a neural network, when image capturing is performed. The image capturing apparatus of this kind performs processing on a captured image using a learned model that is generated by the machine learning method in a manner adapted to a specific object designated by a user in advance. Although only several types of an object, such as a person, a car, and a train, can be designated by a user as the specific object at present, it is expected that the number of types will become larger and larger. Further, the above-mentioned learned model has been conventionally used only for detection of an object (determination of a main object) when AF (auto-focus) processing is performed. However, it is considered that application of the learned model will spread to processing on a captured image performed when AE (auto-exposure) processing, AWB (auto-white balance) processing, image processing, noise reduction, etc., are performed.

In such a case, although a plurality of learned models are required for respective types of an object and respective types of processing on a captured image, it is impossible to store all of the learned models in the image capturing apparatus in a case where the storage capacity is insufficient. In this case, it is necessary to replace the learned models stored in the image capturing apparatus with others, as required.

For example, in Japanese Laid-Open Patent Publication (Kokai) No. 2008-67316, there has been disclosed a server that generates a high-resolution image whose image quality is controlled according to a request from a client terminal and transmits the generated image to the client terminal.

However, although Japanese Laid-Open Patent Publication (Kokai) No. 2008-67316 discloses exchange of a high-resolution image between the server and the client terminal, there is no disclosure of exchange of a learned model generated by by a machine learning method between a server and a client terminal.

SUMMARY OF THE INVENTION

The present invention provides an image capturing apparatus that is capable of replacing a learned model for performing processing on a captured image, with another, as required, an information processing apparatus, a learned model selection system, a method of controlling the image capturing apparatus, a method of controlling the information processing apparatus, and a storage medium.

In a first aspect of the present invention, there is provided an image capturing apparatus comprising an image capturing unit configured to generate a captured image by capturing an image of an object, a communication unit configured to communicate with an information processing apparatus that stores first learned models associated with a plurality of classes, respectively, a learned model execution unit configured to execute processing on the captured image using one of the first learned models which is associated with a high-priority class which is one of the plurality of classes, a history data generation unit configured to generate history data based on at least one of the captured image and image capturing information at the time of capturing the image, an acquisition unit configured to acquire learned coefficient parameters of one of the first learned models which is associated with another class of the plurality of classes, from the information processing apparatus via the communication unit, based on the generated history data, and a change unit configured to change settings of the one of the first learned models which is used by the learned model execution unit, based on the acquired learned coefficient parameters.

In a second aspect of the present invention, there is provided an information processing apparatus comprising a learned model storage unit configured to store first learned models associated with a plurality of classes, respectively, a communication unit configured to communicate with an image capturing apparatus that generates a captured image by capturing an image of an object and performs processing on the captured image using one of the first learned models which is associated with a high-priority class which is one of the plurality of classes, a first reception unit configured to receive the captured image and image capturing information at the time of capturing the image from the image capturing apparatus via the communication unit, a history data generation unit configured to generate history data based on at least one of the received captured image and image capturing information at the time of capturing the image, and a transmission unit configured to transmit learned coefficient parameters of one of the first learned models which is associated with another class of the plurality of classes to the image capturing apparatus via the communication unit, based on the history data generated by the history data generation unit.

In a third aspect of the present invention, there is provided a learned model selection system including an image capturing apparatus that generates a captured image by capturing an image of an object, and an information processing apparatus that stores first learned models associated with a plurality of classes, respectively, wherein the image capturing apparatus comprises a learned model execution unit configured to execute processing on the captured image using one of the first learned models which is associated with a high-priority class which is one of the plurality of classes, and a first transmission unit configured to transmit the captured image and image capturing information at the time of capturing the image to the information processing apparatus, wherein the information processing apparatus comprises a history data generation unit configured to generate history data based on at least one of the captured image and the image capturing information at the time of capturing the image which are transmitted from the image capturing apparatus, and a second transmission unit configured to transmit learned coefficient parameters of one of the first learned models which is associated with another class of the plurality of classes to the image capturing apparatus, based on the generated history data, the image capturing apparatus further comprising a change unit configured to change settings of the one of the first learned models which is used by the learned model execution unit, based on the learned coefficient parameters transmitted from the information processing apparatus.

In a fourth aspect of the present invention, there is provided a learned model selection system including an image capturing apparatus that generates a captured image by capturing an image of an object, a first information processing apparatus, and a second information processing apparatus that stores first learned models associated with a plurality of classes, respectively, wherein the image capturing apparatus comprises a learned model execution unit configured to execute processing on the captured image using one of the first learned models which is associated with a high-priority class which is one of the plurality of classes, and a first transmission unit configured to transmit the captured image and image capturing information at the time of capturing the image to the first information processing apparatus, wherein the first information processing apparatus comprises a history data generation unit configured to generate history data based on at least one of the captured image and the image capturing information at the time of capturing the image which are transmitted from the image capturing apparatus, an update unit configured to update the high-priority class to another class of the plurality of classes based on the generated history data, an acquisition unit configured to acquire learned coefficient parameters of one of the first learned models which is associated with the updated high-priority class, from the second information processing apparatus, and a second transmission unit configured to transmit the acquired learned coefficient parameters to the image capturing apparatus, the image capturing apparatus further comprising a change unit configured to change settings of the one of the first learned models which is used by the learned model execution unit, based on the learned coefficient parameters transmitted from the first information processing apparatus.

In a fifth aspect of the present invention, there is provided a method of controlling an image capturing apparatus that communicates with an information processing apparatus storing first learned models associated with a plurality of classes, respectively, comprising generating a captured image by capturing an image of an object executing processing on the captured image using one of the first learned models which is associated with a high-priority class which is one of the plurality of classes, generating history data based on at least one of the captured image and image capturing information at the time of capturing the image, acquiring learned coefficient parameters of the first learned model associated with another class of the plurality of classes, from the information processing apparatus, based on the generated history data, and changing settings of the one of the first learned models which is used for execution of the processing on the captured image, based on the acquired learned coefficient parameters.

In a sixth aspect of the present invention, there is provided a method of controlling an information processing apparatus that communicates with an image capturing apparatus that generates a captured image by capturing an image of an object and performs processing on the captured image using a first learned model associated with a high-priority class which is one of a plurality of classes, comprising storing first learned models associated with the plurality of classes, respectively, receiving the captured image and image capturing information at the time of capturing the image from the image capturing apparatus, generating history data based on at least one of the received captured image and image capturing information at the time of capturing the image, and transmitting learned coefficient parameters of one of the first learned models which is associated with another class of the plurality of classes, to the image capturing apparatus, based on the generated history data.

According to the present invention, it is possible to replace a learned model for performing processing on a captured image, with another, as required.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. Note that the present invention is not limited to the embodiments described below, and not all combinations of features described in the embodiments are absolutely essential for the solution according to the invention.

Hereafter, as a learned model selection system according to a first embodiment of the present invention, a system 10a comprised of an image capturing apparatus C and a server SV as an information processing apparatus, and a system 10b comprised of the image capturing apparatus C and a mobile terminal SP as the information processing apparatus will be described in detail. However, the learned model selection system of the present invention is not limited to the systems 10a and 10b which are described below by way of example.

Figure 1A:
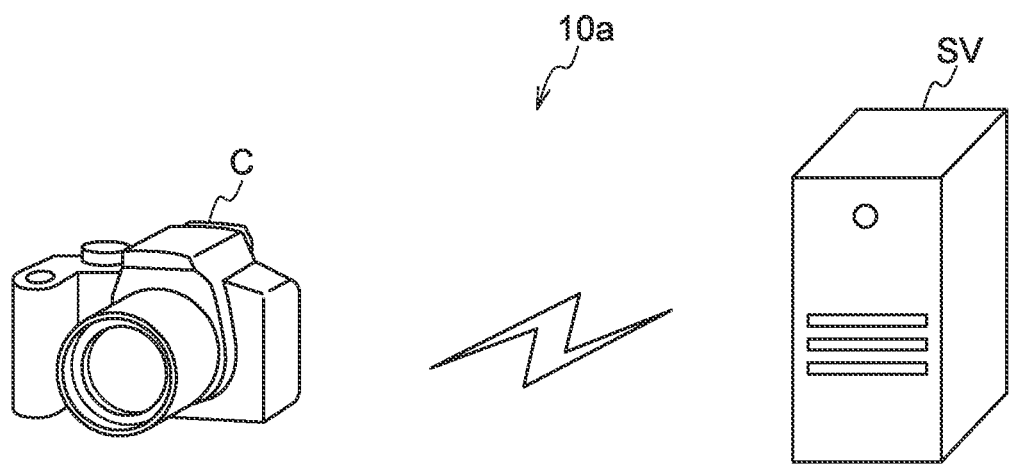
FIGS. 1A and 1B are system configuration diagrams of a learned model selection system according to a first embodiment of the present invention.
Figure 1B:
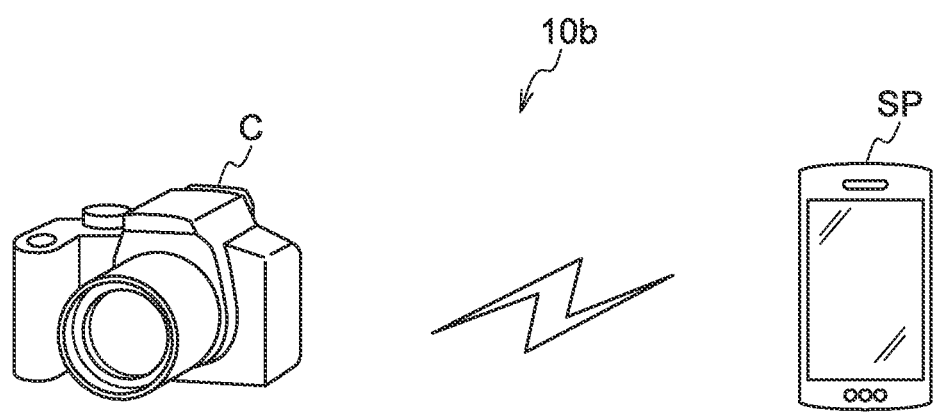

FIGS. 1A and 1B are system configuration diagrams of the systems 10a and 10b.

As shown in FIG. 1A, in the system 10a, the image capturing apparatus C and the server SV are connected to each other via a wireless communication network (or a wired communication network, not shown).

Further, as shown in FIG. 1B, in the system 10b, the image capturing apparatus C and the mobile terminal SP are connected to each other via a wireless communication network (or a wired communication network, not shown).

Figure 2:
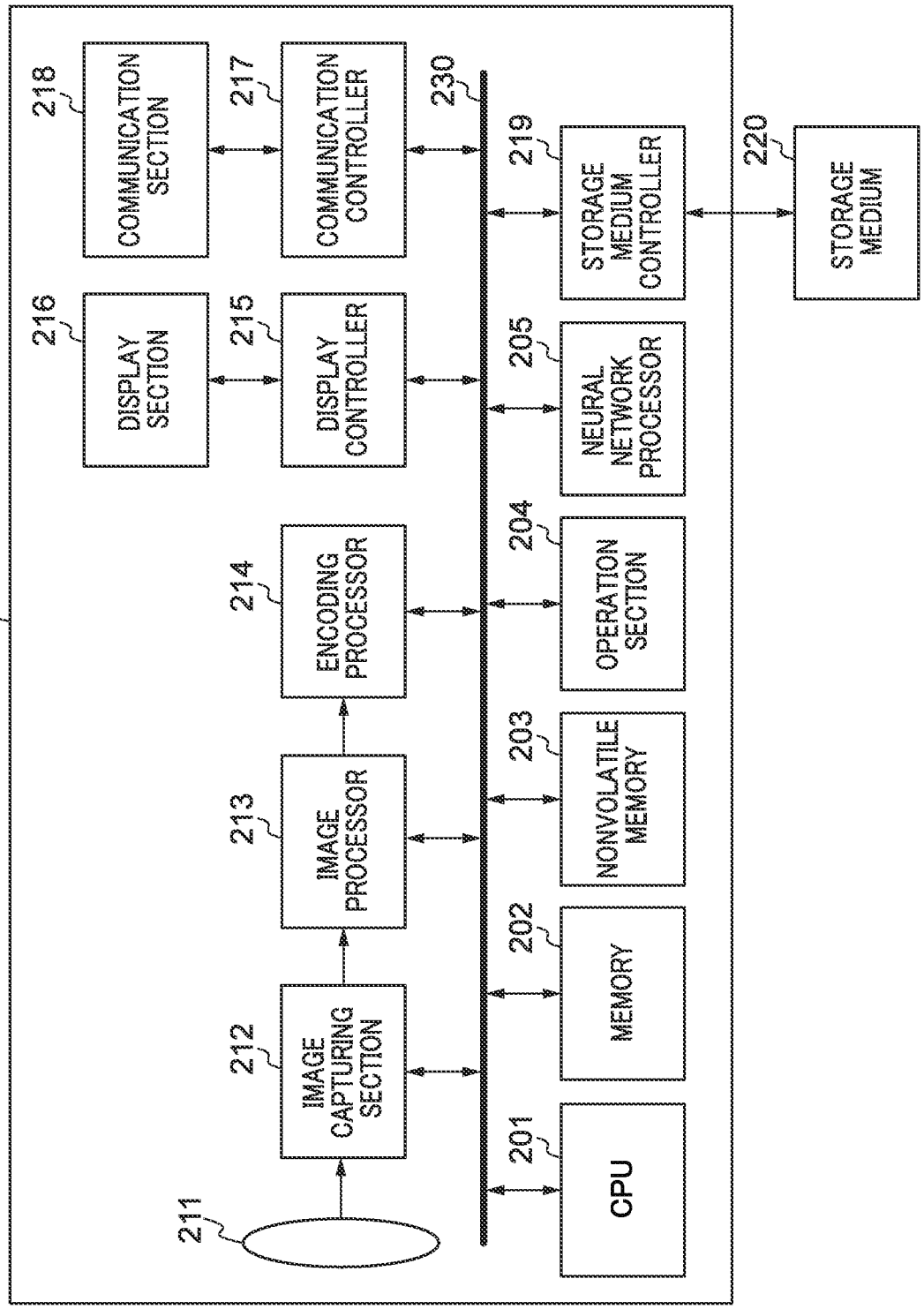
FIG. 2 is a block diagram showing a hardware configuration of an image capturing apparatus appearing in FIG. 1A.

FIG. 2 is a block diagram showing a hardware configuration of the image capturing apparatus C.

As shown in FIG. 2, the image capturing apparatus C includes a CPU 201, a memory 202, a nonvolatile memory 203, an operation section 204, a neural network processor 205, an image capturing section 212, an image processor 213, and an encoding processor 214. Further, the image capturing apparatus C includes a display controller 215, a display section 216, a communication controller 217, a communication section 218, a storage medium controller 219, and an internal bus 230 connecting these components of the image capturing apparatus C. Further, the image capturing apparatus C forms an optical image of an object on a pixel array of the image capturing section 212 using a shooting lens 211, and the shooting lens 211 may be removable or unremovable from a body (a casing, a main body) of the image capturing apparatus C. Further, the image capturing apparatus C writes and reads image data in and from a storage medium 220 via the storage medium controller 219, and the storage medium 220 may be removable or unremovable from the image capturing apparatus C.

The CPU 201 controls the operations of the components (functional blocks) of the image capturing apparatus C via the internal bus 230 by executing computer programs stored in the nonvolatile memory 203.

The memory 202 is a rewritable volatile memory. The memory 202 temporarily stores the computer programs for controlling the operations of the components of the image capturing apparatus C, information, such as parameters associated with the operations of the components of the image capturing apparatus C, information received by the communication controller 217, and so forth. Further, the memory 202 temporarily stores image data acquired by the image capturing section 212, and image data and information processed by the image processor 213, the encoding processor 214, and so forth. The memory 202 has a storage capacity sufficient to temporarily store the image data and information. Further, the memory 202 stores history data generated based on captured image data and parameters used at the time of image capturing. Details of the history data will be described hereinafter.

The nonvolatile memory 203 is an electrically erasable and recordable memory, and for example, an EEPROM, a hard disk, or the like is used. The nonvolatile memory 203 stores the computer programs for controlling the operations of the components of the image capturing apparatus C and information, such as parameters associated with the operations of the components of the image capturing apparatus C. Various operations performed by the image capturing apparatus C are realized by executing the above-mentioned computer programs. Further, the nonvolatile memory 203 stores a computer program describing details of neural network processing and learned coefficient parameters, including weight coefficients and bias values, which are used by the neural network processor 205. Note that the weight coefficient is a value indicating the intensity of connection between nodes in the neural network, and the bias value is a value for adding an offset to the sum of input data multiplied by weight coefficients. The nonvolatile memory 203 is capable of storing a plurality of sets of learned coefficient parameters and a plurality of computer programs each describing neural network processing. Further, the nonvolatile memory 203 stores past history data.

The operation section 204 provides a user interface for operating the image capturing apparatus C. The operation section 204 includes various buttons, such as a power supply button, a menu button, a release button for shooting, a moving image-recording button, and a cancel button, and the various buttons are implemented by switches, a touch panel, etc. The CPU 201 controls the image capturing apparatus C according to a user's instruction input via the operation section 204. Note that, here, although the description is given of the case where the CPU 201 controls the image capturing apparatus C based on an operation input via the operation section 204 by way of example, this is not limitative. For example, the CPU 201 may control the image capturing apparatus C based on a request input via the communication section 218 from a remote controller, not shown, a mobile terminal, not shown, or the like.

The neural network processor 205 will be described hereinafter with reference to FIG. 3.

The shooting lens (lens unit) 211 is formed by a lens group, not shown, including a zoom lens, a focus lens, and so forth, a lens controller, not shown, a diaphragm, not shown, and so forth. The shooting lens 211 can function as zoom means for changing an angle of view. The lens controller of the shooting lens 211 adjusts the focus and controls an aperture value (F value) according to a control signal delivered from the CPU 201.

The image capturing section 212 can function as acquiring means for sequentially acquiring a plurality of images forming a moving image. As the image capturing section 212, for example, an area image sensor, such as a CCD (Charge Coupled Device) or CMOS (Complementary Metal Oxide film Semiconductor) device, is used. The image capturing section 212 has the pixel array, not shown, in which photoelectric conversion elements, not shown, are arranged in a matrix, i.e. two-dimensionally arranged, for converting an optical image of an object to electrical signals. The optical image of the object is formed on the pixel array by the shooting lens 211. The image capturing section 212 outputs a captured image (i.e. image data thereof) to the image processor 213 or the memory 202. Note that the image capturing section 212 can also acquire a still image (i.e. still image data).

The image processor 213 performs predetermined image processing on image data output from the image capturing section 212 or image data read from the memory 202. Examples of the image processing include dynamic range conversion, interpolation, size reduction (resizing), and color conversion. Further, the image processor 213 performs predetermined calculation processing for exposure control, ranging control, etc., using image data acquired by the image capturing section 212. The exposure control, ranging control, etc., are performed by the CPU 201 based on calculation results obtained by the calculation processing performed by the image processor 213. Specifically, the AE processing, the AWB processing, the AF processing, etc., are performed by the CPU 201. Note that the AE processing, the AWB processing, and the AF processing may be performed partially by using the neural network processor 205.

The encoding processor 214 reduces the size of image data by performing intra-frame predictive encoding (intra-screen predictive encoding), inter-frame predictive encoding (inter-screen predictive encoding), etc., on image data. The encoding processor 214 is implemented e.g. by a semiconductor device. The encoding processor 214 may be provided outside the image capturing apparatus C. Further, the processing to be performed by the encoding processor 214 may be performed partially by using the neural network processor 205.

The display controller 215 controls the display section 216. The display section 216 is provided with a display screen, not shown. The display controller 215 generates an image which can be displayed on the display screen of the display section 216, and outputs the generated image, i.e. image signals to the display section 216. Further, the display controller 215 is capable of outputting image data not only to the display section 216, but also to an external apparatus via the communication controller 217. The display section 216 displays an image on the display screen based on the image signals sent from the display controller 215. The display section 216 is equipped with an OSD (On Screen Display) function which is a function of displaying a setting screen, such as a menu screen, on the display screen. The display controller 215 is capable of outputting image signals to the display section 216 after superposing an OSD image thereon. The display section 216 is formed by a liquid crystal display, an organic EL display, or the like, and displays image signals sent from the display controller 215. The display section 216 may be a touch panel, for example. In a case where the display section 216 is a touch panel, the display section 216 can also function as the operation section 204.

The communication controller 217 is controlled by the CPU 201. The communication controller 217 is configured to generate a modulated signal conforming to a wireless communication standard, such as IEEE 802.11, output the modulated signal to the communication section 218, and receive a modulated signal from an external apparatus via the communication section 218. Further, the communication controller 217 is capable of transmitting and receiving control signals for video signals. For example, the communication controller 217 may control the communication section 218 according to control signals for delivering video signals conforming to a communication standard, such as HDMI (High Definition Multimedia Interface) or SDI (Serial Digital Interface).

The communication section 218 converts the video signals and the control signals to physical electrical signals, and transmits and receives the electrical signals to and from an external apparatus. Note that although the description is given of the case where wireless communication of the video signals and the control signals is performed by the communication section 218 by way of example, the communication performed by the communication section 218 is not limited to these.

The storage medium controller 219 controls the storage medium 220. The storage medium controller 219 outputs a control signal for controlling the storage medium 220 to the storage medium 220 based on a request from the CPU 201.

As the storage medium 220, for example, a nonvolatile memory, a magnetic disk, or the like is used. The storage medium 220 may be removable or unremovable as mentioned above. The storage medium 220 stores encoded image data, etc. Image data, etc., are stored as a file in a format adapted to a file system of the storage medium 220.

The functional blocks 201 to 205, 212 to 215, 217, and 219 can access to each other via the internal bus 230.

Figure 3:
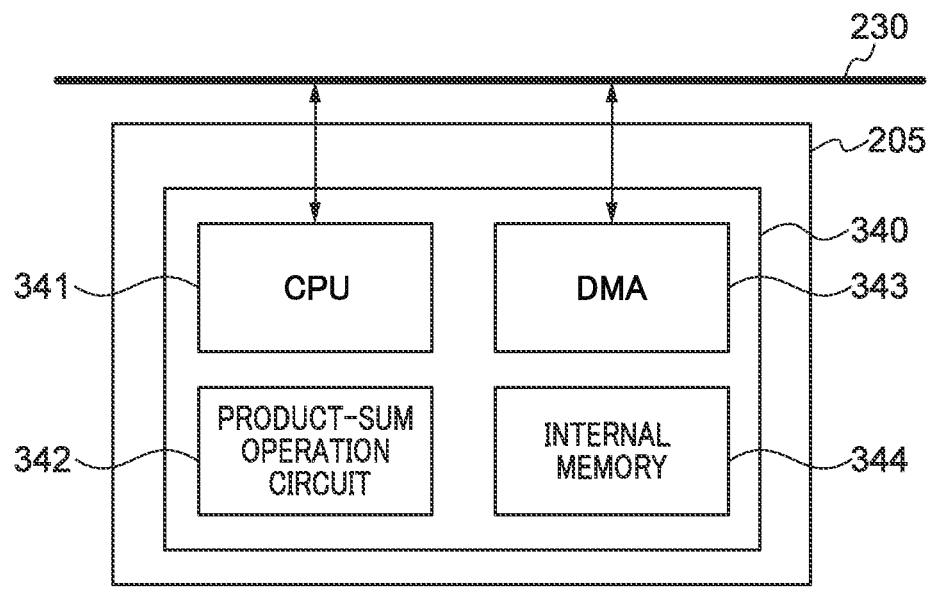
FIG. 3 is a schematic diagram showing a configuration of a neural network processor appearing in FIG. 2.

FIG. 3 is a schematic diagram showing a configuration of the neural network processor 205 appearing in FIG. 2.

The neural network processor 205 executes neural network processing using coefficient parameters learned in advance. Note that the neural network processing refers e.g. to processing of CNN (Convolutional Neural Network) formed by a convolution layer, a pooling layer, and a fully connected layer, but this is not limitative. Further, the above-mentioned learned coefficient parameters correspond, in the fully connected layer, to weight coefficients and bias values held by each edge connecting between nodes in layers and correspond, in the convolution layer, to weight coefficients and bias values of each kernel (filter).

As shown in FIG. 3, the neural network processor 205 is configured such that a neural core 340 includes a CPU 341, a product-sum operation circuit 342, a DMA 343, and an internal memory 344.

The CPU 341 (learned model execution unit) acquires a computer program describing details of neural network processing from the memory 202 or the nonvolatile memory 203 via the internal bus 230, or from the internal memory 344, and executes the acquired program. Further, the CPU 341 also controls the product-sum operation circuit 342 and the DMA 343.

The product-sum operation circuit 342 is a circuit that performs a product-sum calculation in the neural network. The product-sum operation circuit 342 has a plurality of product-sum operation sections capable of parallel calculation. Further, the product-sum operation circuit 342 outputs intermediate data calculated in parallel by the plurality of product-sum operation sections, to the internal memory 344 via the DMA 343.

The DMA 343 is a circuit specific to data transfer without using the CPU 341 and performs data transfer between the memory 202 or the nonvolatile memory 203 and the internal memory 344 via the internal bus 230. Further, the DMA 343 also performs data transfer between the product-sum operation circuit 342 and the internal memory 344. Examples of the data transferred by the DMA 343 include the computer program describing details of neural network processing, the learned coefficient parameters, and the intermediate data calculated by the product-sum operation circuit 342.

The internal memory 344 stores the computer program describing details of neural network processing, the learned coefficient parameters, the intermediate data calculated by the product-sum operation circuit 342, etc. Further, the internal memory 344 may have a plurality of banks and dynamically switch between the banks.

Here, the above-mentioned history data will be described. In the present embodiment, the history data includes information indicating what kind of a shooting scene a captured image by the image capturing apparatus C corresponds to and what kind of object is included in the captured image. Here, the shooting scene means a scene which is determined by the image capturing apparatus C as a scene of which an image is to be captured, based on a shooting mode designated by a user and shooting parameters, such as an exposure condition. Further, the history data may include GPS information and weather information. Furthermore, the history data may include information of AF, AE, AWB, an ISO sensitivity, a shutter speed, a depth of field, etc., which are settings used at the time of image capturing. In the present embodiment, the history data is output as a result of classification processing performed by a history processing neural network which is one of neural networks included in the neural network processor 205 (classification unit) of the image capturing apparatus C. This makes it possible, in a case where an object is irregularly moving (such as a race or an animal), or in a case where a shooting scene is a dark place or a scene under an artificial light source, such as an aquarium, a night scene, or fireworks, to adjust optimum settings for image capturing according to a result of the processing performed by the above-mentioned neural network in the image capturing apparatus C. Note that the history processing neural network is a neural network that classifies a main object included in a captured image and a shooting scene of the image each into one of a plurality of classes. By using the history data, the shooting frequency of an object in an image captured by a user or that of a shooting scene can be determined by the image capturing apparatus C. Further, the neural network processor 205 may further classify the main object included in the captured image and the shooting scene of the image according to the GPS and a weather condition.

Figure 4:
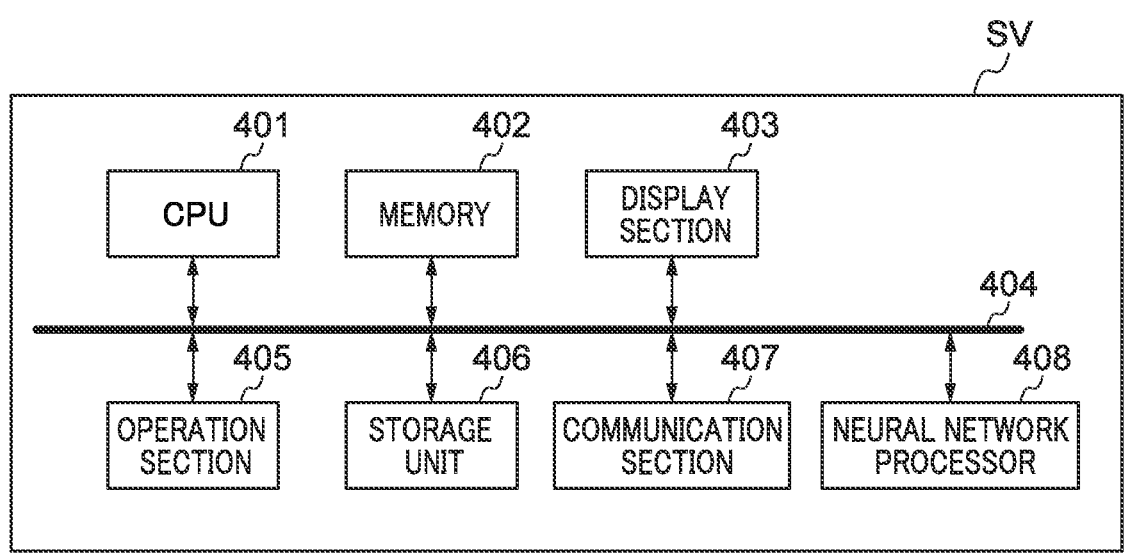
FIG. 4 is a block diagram showing a hardware configuration of a server as an information processing apparatus appearing in FIG. 1A.

FIG. 4 is a block diagram showing a hardware configuration of the server SV.

As shown in FIG. 4, the server SV includes a CPU 401, a memory 402, a display section 403, an operation section 405, a storage unit 406, a communication section 407, a neural network processor 408, and an internal bus 404 connecting these.

The CPU 401 controls all of the processing blocks forming the server SV by executing computer programs stored in the storage unit 406.

The memory 402 is a memory mainly used as a work area for the CPU 401 and a buffer area for temporarily storing data.

The display section 403 is formed by a liquid crystal panel, an organic EL panel, or the like, and displays an operation screen, etc., according to an instruction from the CPU 401.

The internal bus 404 is a bus for interconnecting the processing blocks of the server SV.

The operation section 405 is formed by a keyboard, a mouse, buttons, and a touch panel, or a remote controller, etc., and receives an operation instruction input by a user. The operation information input from the operation section 405 is sent to the CPU 401, and the CPU 401 executes control for each processing block based on the received operation information.

The storage unit 406 is a processing block that is formed by a storage medium into which various data is stored or from which the same is read out according to an instruction from the CPU 401. The storage medium is implemented e.g. by an EEPROM, a built-in flash memory, a built-in hard disk, or a removable memory card. The storage unit 406 stores input data which is data for learning and teacher data, which are used by the neural network processor 408. Note that in a case where teacher data is newly generated, a result obtained by using a high-performance learned model, which requires a processing time but is capable of high-accuracy determination, is generated as the teacher data and stored in the storage unit 406.

The communication section 407 is provided with hardware, etc., for performing communication via a wireless LAN and a wired LAN. For the wireless LAN, the communication section 407 is a processing block conforming e.g. to the IEEE 802.11n/a/g/b. The communication section 407 is connected to an external access point via the wireless LAN and performs wireless LAN communication with another wireless communication device via the access point. Further, for the wired LAN, the communication section 407 performs communication using an Ethernet cable via an external router or a switching hub. The communication section 407 performs communication with an external apparatus, such as the image capturing apparatus C, to exchange information, such as an image data, control data, data for learning, and a learned model.

The neural network processor 408 performs neural network learning using the data for learning, which is stored in the storage unit 406, and a neural network model generated in advance. The neural network processor 408 performs learning for building learned models associated with objects of different classes, respectively, using image data as input data. Further, the image data as the input data may be received according to a user's instruction via the operation section 405 or may be received from the communication section 407 programmed in advance, or may be loaded from image data stored in the storage unit 406. The neural network processor 408 is implemented by a GPU (Graphic Processing Unit) or a DSP (Digital Signal Processor). Note that the neural network learning may be performed by the CPU 401 without providing the neural network processor 408 or performed by both of the CPU 401 and the neural network processor 408. Further, the learned model obtained as a result of learning performed by the neural network processor 408 is also stored in the storage unit 406 (learned model storage unit).

Figure 5:
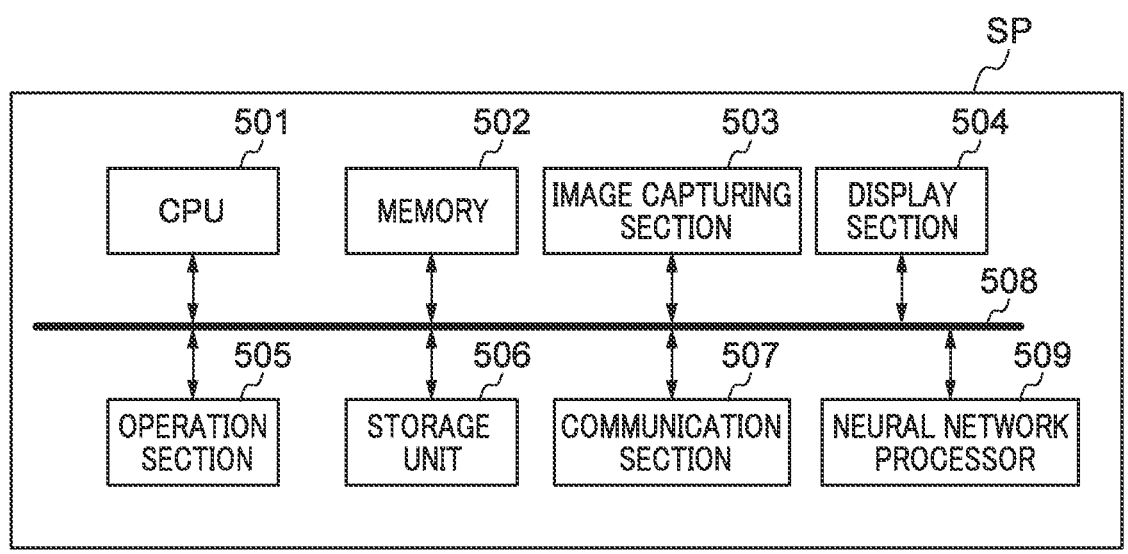
FIG. 5 is a block diagram showing a hardware configuration of a mobile terminal as the information processing apparatus appearing in FIG. 1A.

FIG. 5 is a block diagram showing a hardware configuration of the mobile terminal SP.

As shown in FIG. 5, the mobile terminal SP includes a CPU 501, a memory 502, an image capturing section 503, a display section 504, an operation section 505, a storage unit 506, a communication section 507, a neural network processor 509, and an internal bus 508 connecting these.

The CPU 501 controls all of the processing blocks forming the mobile terminal SP by executing computer programs stored in the storage unit 506.

The memory 502 is a memory mainly used as a work area for the CPU 501 and a buffer area for temporarily storing data. The programs, such as an OS (Operation System) and applications, are loaded in the memory 502 and are executed by the CPU 501.

The image capturing section 503 is a processing block that is provided with an optical lens, a CMOS sensor, a digital image processor, etc., and acquires captured image data by photoelectrically converting an optical image formed via the optical lens into analog signals, converting the thus acquired analog signals to digital data. The captured image data acquired by the image capturing section 503 is temporarily stored in the memory 502 and processed under the control of the CPU 501. For example, the CPU 501 causes the storage unit 506 to store the captured image data in the storage medium, and causes the communication section 507 to transmit the captured image data to an external device, and so forth. Further, the image capturing section 503 is provided with a lens controller, and the lens controller controls zooming, focusing, aperture adjustment, etc., according to a command from the CPU 501.

The display section 504 is formed by a liquid crystal panel, an organic EL panel, or the like, and displays an operation screen, a captured image, etc., according to an instruction from the CPU 501.

The operation section 505 is formed by a keyboard, a mouse, buttons, a cross key, and a touch panel, or a remote controller, etc., and receives an operation instruction input by a user. The operation information input from the operation section 505 is sent to the CPU 501, and the CPU 501 executes control for each processing block based on the received operation information.

The storage unit 506 is a processing block that is formed by a large-capacity storage medium into which various data is stored or from which the same is readout according to an instruction from the CPU 501. The storage medium is implemented e.g. by a built-in flash memory, a built-in hard disk, or a removable memory card. The storage unit 506 stores input data which is data for learning and teacher data, which are used by the neural network processor 509.

The communication section 507 is a processing block that is provided with an antenna, processing hardware for performing communication via a wireless LAN and a wired LAN, etc., and performs wireless LAN communication conforming e.g. to IEEE 802.11n/a/g/b. The communication section 507 is connected to an external access point via the wireless LAN and performs, wireless LAN communication with another wireless communication device via the access point.

The internal bus 508 is a bus for interconnecting the processing blocks of the mobile terminal SP.

The neural network processor 509 performs neural network learning using the data for learning, which is stored in the storage unit 506, and a neural network model generated in advance. The neural network processor 509 performs learning operations associated with objects of different classes, respectively, using image data as input data. Further, the image data as the input data may be received by a user's instruction input via the operation section 505 or may be received from the communication section 507 programmed in advance, or may be loaded from image data stored in the storage unit 506. The neural network processor 509 is implemented by a GPU (Graphic Processing Unit) or a DSP (Digital Signal Processor). Note that the neural network learning may be performed by the CPU 501 without providing the neural network processor 509 or may be performed by both of the CPU 501 and the neural network processor 509. Further, the learned model obtained as a result of learning performed by the neural network processor 509 is also stored in the storage unit 506 (learned model storage unit).

Figure 6:
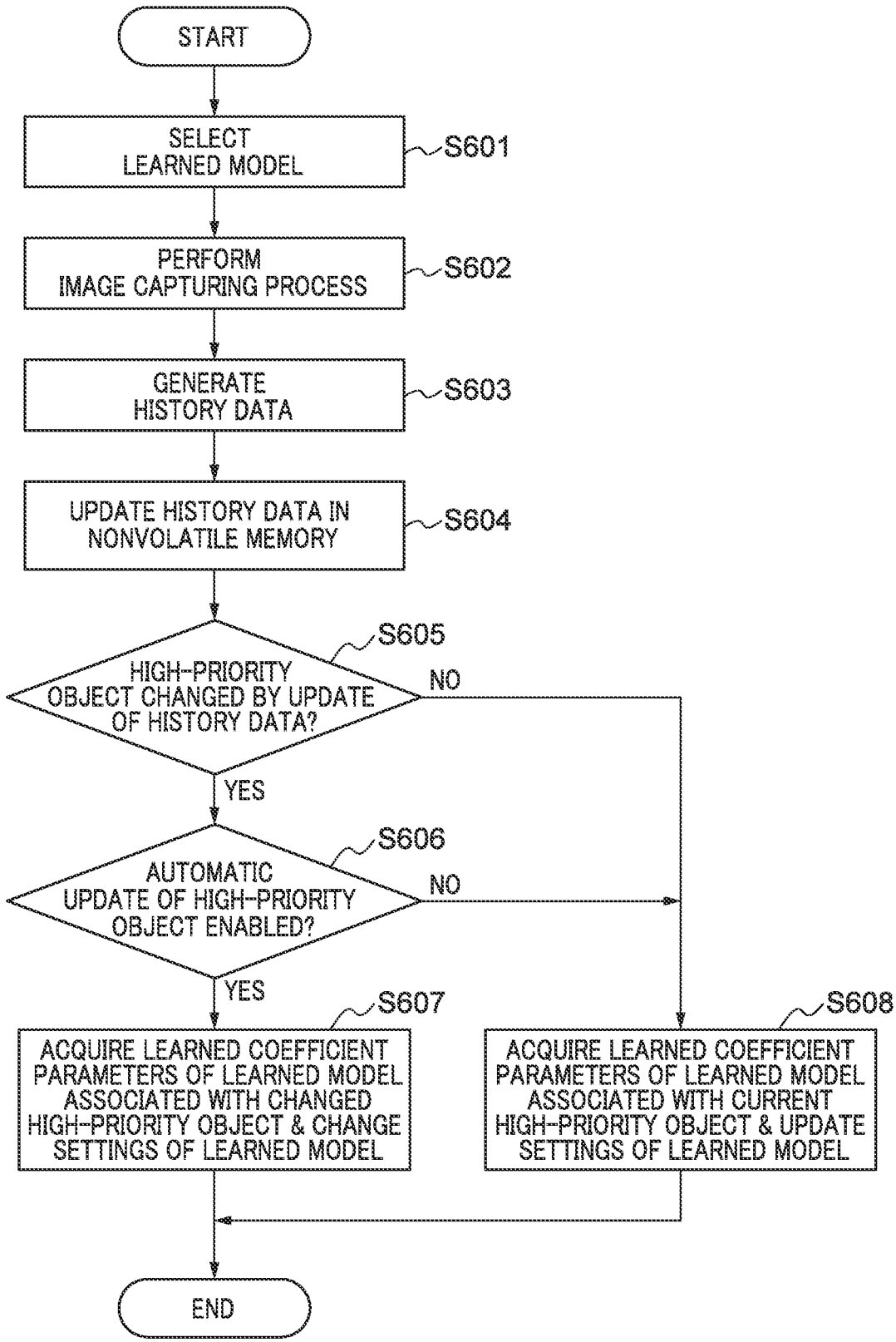
FIG. 6 is a flowchart of a learned model settings-changing process performed by the image capturing apparatus according to the first embodiment.

A flow of a learned model settings-changing process performed by the image capturing apparatus C according to the first embodiment will be described with reference to FIG. 6.

This process is realized, when the image capturing apparatus C is in a power-on state, by the CPU 201 loading the associated computer program stored in the nonvolatile memory 203 into the memory 202 and executing the same. Further, the present process is started when a user selects settings to be used at the time of shooting via a menu screen displayed on the display section 216 from the operation section 204 and then gives an image capturing start instruction by fully pressing the release button, not shown. Note that the present process may be automatically and repeatedly executed during operation of the image capturing section 212 in an shooting mode in the power-on state. Alternatively, the present process may be started when the release button is half-pressed. In this case, the present process is executed in parallel with the AF, AE, and AWB processing operations, etc.

Further, a plurality of learned models associated with high-priority objects and the history processing neural network are stored in the nonvolatile memory 203 in advance. Note that the plurality of learned models associated with high-priority objects are each used in performing one of neural network processing operations on captured image data obtained in a step S602, described hereinafter, such as object detection (determination of a main object), boundary classification, image processing, and noise reduction.

In a step S601, the CPU 201 selects one of the learned models stored in the nonvolatile memory 203 according to the settings to be used at the time of shooting, which are selected by the user before starting the present process. For example, if a setting to be used at the time of shooting, which is selected by the user before starting the present process, is a setting of AF, a learned model used to perform object detection (determination of a main object) is selected. The CPU 201 causes the image capturing section 212 to acquire image data and causes the neural network processor 205 to determine a main object using this image data as the input data. Then, the CPU 201 performs the AF processing on the determined main object, and then proceeds to the step S602.

In the step S602, the CPU 201 controls the image capturing section 212, the image processor 213, and the encoding processor 214 to thereby perform an image capturing process and then proceeds to a step S603. Further, the CPU 201 stores captured image data before being encoded by the encoding processor 214 in the memory 202.

In the step S603, the CPU 201 (history data generation unit) generates history data. Specifically, the CPU 201 inputs the captured image data before being encoded, which is stored in the memory 202 in the step S602, to the neural network processor 205 and outputs the above-mentioned history data by using the history processing neural network. Note that the CPU 201 may input not only the captured image, but also image capturing information to the neural network processor 205 to output the history data. Further, in the present process, the computer program describing details of neural network processing and the learned coefficient parameters, which are to be used for processing by the neural network processor 205, are sequentially read out from the memory 202 or the nonvolatile memory 203, for processing. Note that the history processing neural network refers to neural network processing for outputting history data. For example, a general neural network for classification is applied to the history processing neural network, and the history processing neural network is capable of classifying a main object into one of a plurality of object classes, such as a person, an animal, and a physical object.

In a step S604, the CPU 201 updates the history data by replacing old history data stored in the nonvolatile memory 203 with the new history data generated in the step S603. For example, in a case where in the history data generated in the step S603, the main object of the captured image obtained in the step S602 is classified into the class of a person, the history data is updated to history data in which the shooting frequency of the class of a person is increased and then the CPU 201 proceeds to a step S605. Note that the old history data is used in the step S605, and hence the CPU 201 saves the old history data in the memory 202. If no old history data exists, the CPU 201 stores the history data generated in the step S603 into the nonvolatile memory 203, followed by terminating the present process.

In the step S605, first, the CPU 201 compares the new history data stored in the nonvolatile memory 203 with the old history data stored in the memory 202. After that, the CPU 201 determines, based on a result of the comparison, whether or not the priority of the object shot by the user as the main object (hereinafter simply referred to as the priority of the object) has been changed by the update of the history data. Specifically, when the ranking of shooting frequencies of respective classes has been changed in the history data, the CPU 201 determines that the priority of the object has been changed. If it is determined that the priority of the object has been changed (YES to the step S605), the CPU 201 proceeds to a step S606. On the other hand, if it is determined that the priority of the object has not been changed (NO to the step S605), the CPU 201 proceeds to a step S608.

In the step S606, the CPU 201 changes the high-priority object to the object of the class whose ranking of the shooting frequency has become higher, and determines whether or not to change the learned model to a learned model associated with the high-priority object after the change (whether automatic update is enabled or disabled). Here, in the present embodiment, if the user does not desire to automatically update the high-priority object, the user sets the automatic update to be disabled using the menu screen shown in FIG. 7A, described hereinafter, in advance, whereas if the user desires to automatically update the high-priority object, the user sets the automatic update to be enabled using the menu screen shown in FIG. 7A in advance. Further, the nonvolatile memory 203 holds this state of settings set by the user from the menu screen shown in FIG. 7A (hereinafter referred to as the menu-based settings state). Therefore, the CPU 201 determines, based on the menu-based settings state held in the nonvolatile memory 203, whether the automatic update is enabled or disabled. Specifically, in a case where the menu-based settings state indicates that the automatic update is disabled, even when the high-priority object is changed in the step S606, the CPU 201 does not change the learned model to a learned model associated with the changed object, i.e. determines that the automatic update is disabled. On the other hand, in a case where the menu-based settings state indicates that the automatic update is enabled, when the high-priority object is changed in the step S606, the CPU 201 changes the learned model to a learned model associated with the changed object, i.e. determines that the automatic update is enabled. However, in a case where the learned model is changed, the capacity of the nonvolatile memory 203 is limited, and hence the learned coefficient parameters of the learned model, stored in the nonvolatile memory 203, are replaced with new ones in a step S607, described hereinafter. If the automatic update is enabled (YES to the step S606), the CPU 201 proceeds to the step S607. If the automatic update is disabled (NO to the step S606), the CPU 201 proceeds to the step S608.

In the step S607, the CPU 201, first, controls the communication controller 217 to acquire learned coefficient parameters of the learned model associated with the changed high-priority object from one of the server SV and the mobile terminal SP via the communication section 218. Then, the CPU 201 changes the settings of the learned model stored in the nonvolatile memory 203, based on the acquired learned coefficient parameters, followed by terminating the present process. Specifically, in the step S607, the CPU 201 replaces the learned coefficient parameters of the learned model associated with the high-priority object before the change, stored in the nonvolatile memory 203, with the acquired learned coefficient parameters.

In the step S608, the CPU 201 controls the communication controller 217 to transmit an inquiry about whether or not the learned model associated with the current high-priority object has been updated, via the communication section 218. The CPU 201, first, acquires, as to the learned model which has been determined, as a result of the inquiry, the learned coefficient parameters of the learned model, from one of the server SV and the mobile terminal SP. Then, the CPU 201 updates the settings of the learned model stored in the nonvolatile memory 203 based on the acquired learned coefficient parameters, followed by terminating the present process. Specifically, in the step S608, the CPU 201 updates the learned coefficient parameters of the learned model associated with the current high-priority object, which are stored in the nonvolatile memory 203, by the acquired learned coefficient parameters.

An example of the menu screen and a shooting-time screen displayed on the display section 216 of the image capturing apparatus C according to the first embodiment will be described with reference to FIGS. 7A to 7C.

Figure 7A:
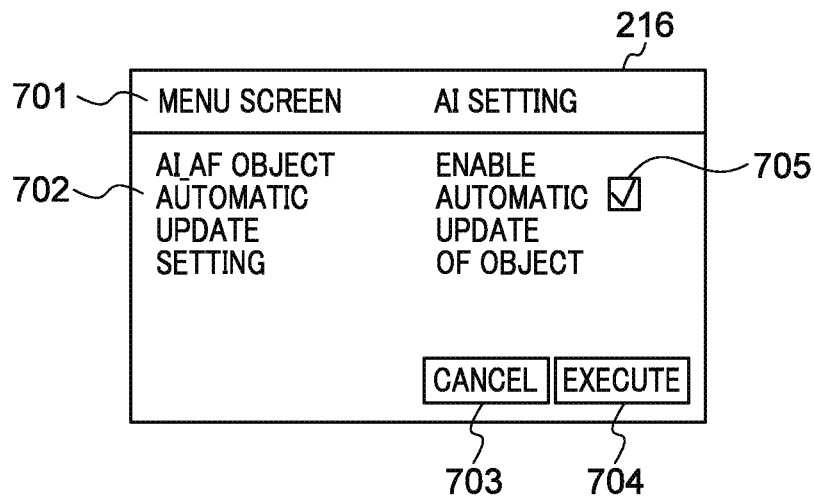
FIGS. 7A to 7C are diagrams showing an example of a menu screen and a shooting-time screen displayed on a display section appearing in FIG. 2.

FIG. 7A is a diagram showing an example of a menu screen displayed when automatic update of the learned model is set for the image capturing apparatus C.

Figure 7B:
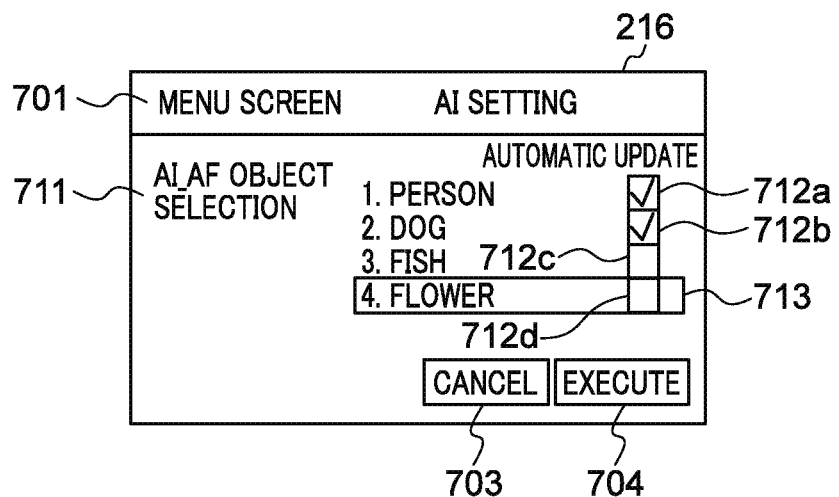

Reference numeral 701 denoting Menu Screen in each of FIGS. 7A and 7B indicates that the displayed screen is for setting menu-based settings.

AI_AF Object Automatic Update Setting, denoted by reference numeral 702, indicates that the displayed screen is for setting whether or not to automatically update an object as a target of AF using machine learning.

A cancel button 703 is for terminating the setting without reflecting a change in the menu-based settings.

An execution button 704 is for reflecting the change in the menu-based settings and executing the setting.

A check button 705 is for switching between a checked state (ON state) and an unchecked state (OFF state) by a user operation. In the ON state, the automatic update of the learned model associated with the object using machine learning is enabled, and in the OFF state, this automatic update is disabled.

FIG. 7B is a diagram showing an example of a menu screen displayed for setting automatic update of the learned model on an object-by-object basis for the image capturing apparatus C. Note that the same items as those appearing in FIG. 7A are denoted by the same reference numerals, and redundant description is omitted.

AI_AF Object Selection 711, denoted by reference numeral 711, indicates that the displayed screen is for individually setting whether or not to perform automatic update with respect to each of a plurality of objects as targets of AF using machine learning. Note that the menu screen shown in FIG. 7B displays names of the plurality of objects in decreasing order of the shooting frequency.

Check buttons 712*a* to 712*d* are associated with different objects, respectively, for switching between a checked state (ON state) and an unchecked state (OFF state) by a user's operation. For example, when the check button 712*a* is in the ON state, the automatic update of the learned model associated with an object "person", associated with this button, is enabled, and when the check button 712*a* is in the OFF state, this automatic update is disabled.

A frame display 713 is for indicating which object is selected out of the plurality of objects.

Note that although on the menu screen shown in FIG. 7B, the check buttons 712*a* to 712*d* are provided for respective classes of objects, a menu screen (not shown) in which check buttons are provided for respective classes of different shooting scenes is also displayed on the display section 216 according to a user instruction.

Figure 7C:
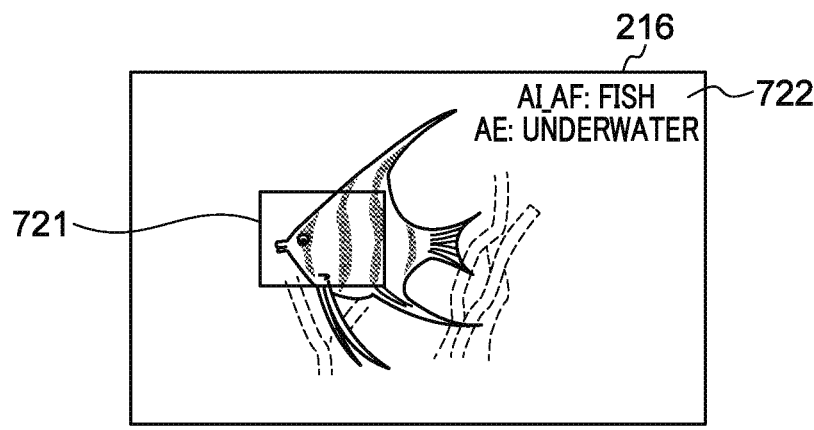

FIG. 7C is a diagram showing an example of the shooting-time screen displayed on the image capturing apparatus C.

An AF frame 721 is a display indicting which part of an object is focused.

An object selection display 722 displays an object as a target of AF using machine learning, selected on the screen shown in FIG. 7B, and a shooting scene as a target of AE using machine learning, selected on an AE selection menu, not shown. Note that each content displayed on the object selection display 722 is only required to be an object or a shooting scene which is a target of a function using machine learning (e.g. AWB) and is not limited to the example shown in FIG. 7C.

As described above, by performing the process according to the first embodiment, the image capturing apparatus C is capable of changing the learned model based on the history data.

Although in the first embodiment, the description is given in detail of the case where a high-priority object is updated, the same process can also be performed in a case where a preferred shooting scene is updated.

As a learned model selection system according to a second embodiment of the present invention, the system 10a comprised of the image capturing apparatus C and the mobile terminal SP as an information processing apparatus will be described in detail below by way of example with reference to accompanying drawings. However, the present invention is not limited to the second embodiment described below by way of example. Further, as the information processing apparatus, the server SV may be used in place of the mobile terminal SP.

In the first embodiment, the image capturing apparatus C generates history data, sets a high-priority object based on the generated history data, and determines a learned model associated with the high-priority object, as the learned model to be updated. On the other hand, in the second embodiment, the image capturing apparatus C generates history data and then transmits the generated history data to the mobile terminal SP, and the mobile terminal SP sets a high-priority object based on the received history data, and determines a learned model associated with the high-priority object, as the learned model required to be updated.

Note that the block configurations of the image capturing apparatus C, the mobile terminal SP, and the server SV according to the second embodiment are the same as those of the first embodiment. Therefore, the same components as those of the first embodiment are denoted by the same reference numerals and redundant description thereof is omitted.

Figure 8:
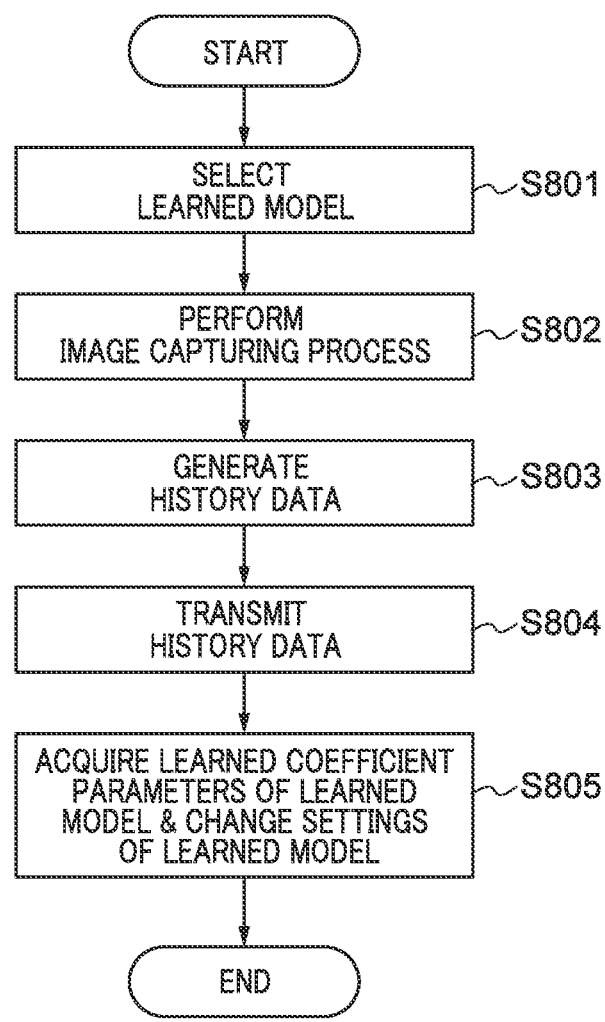
FIG. 8 is a flowchart of a learned model settings-changing process performed by an image capturing apparatus according to a second embodiment of the present invention.

A flow of a process performed by the image capturing apparatus C in the second embodiment will be described with reference to FIG. 8.

This process is realized, when the image capturing apparatus C is in the power-on state, by the CPU 201 loading the associated computer program stored in the nonvolatile memory 203 into the memory 202 and executing the same.

In a step S801, the CPU 201 executes the same processing as in the step S601 and proceeds to a step S802.

In the step S802, the CPU 201 executes the same processing as in the step S602 and proceeds to a step S803.

In the step S803, the CPU 201 executes the same processing as in the step S603 and proceeds to a step S804.

In the step S804, the CPU 201 controls the communication controller 217 to transmit the history data generated in the step S803 to the mobile terminal SP via the communication section 218 and proceeds to a step S805.

In the step S805, the CPU 201 controls the communication controller 217 to receive the learned coefficient parameters of the learned model from the mobile terminal SP via the communication section 218, followed by terminating the present process. Note that the CPU 201 may receive not only the learned coefficient parameters of the learned model, but also information of the high-priority object from the mobile terminal SP and execute the same processing as in the steps S606 to S608.

Figure 9:
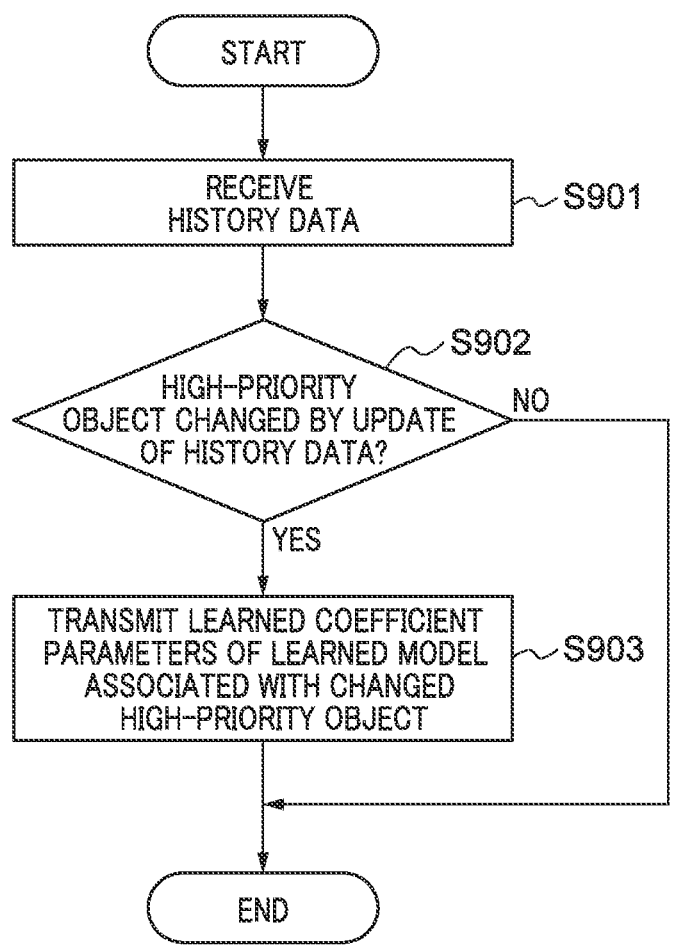
FIG. 9 is a flowchart of a learned model settings-changing process performed by a mobile terminal according to the second embodiment.

A flow of a learned model settings-changing process performed by the mobile terminal SP in the second embodiment will be described with reference to FIG. 9.

This process is realized, when the mobile terminal SP is in a power-on state, by the CPU 501 loading the associated computer program stored in the storage unit 506 into the memory 502 and executing the same.

In a step S901, the CPU 501 controls the communication section 507 to receive the history data from the image capturing apparatus C. The CPU 501 stores the received history data in the memory 502 and proceeds to a step S902. Note that in a case where the history data before the update does not exist in the storage unit 506, the CPU 501 stores the history data stored in the memory 502 into the storage unit 506, followed by terminating the present process.

In the step S902, the CPU 501 executes the same processing as in the step S605. Specifically, the CPU 501 compares the history data stored in the memory 502 with the history data before the update stored in the storage unit 506, and determines whether or not the priority of the object has been changed by the update of the history data. If it is determined that the priority of the object has been changed (YES to the step S902), the CPU 501 proceeds to a step S903. On the other hand, if it is determined that the priority of the object has not been changed (NO to the step S902), the CPU 501 terminates the present process.

In the step S903, the CPU 501, first, changes the high-priority object to the object of the class whose ranking of the shooting frequency has become higher. Then, the CPU 501 controls the communication section 507 to transmit the learned coefficient parameters of the learned model associated with the high-priority object after the change to the image capturing apparatus C, followed by terminating the present process.

As described above, by performing the process according to the second embodiment, the mobile terminal SP is capable of changing the learned model based on the received history data and transmitting the learned coefficient parameters of the updated learned model to the image capturing apparatus C.

As a learned model selection system according to a third embodiment of the present invention, the system 10a comprised of the image capturing apparatus C and the mobile terminal SP as the information processing apparatus will be described in detail below by way of example with reference to accompanying drawings. However, the present invention is not limited to the third embodiment described below by way of example. Further, as the information processing apparatus, the server SV may be used in place of the mobile terminal SP.

In the first and second embodiments, the history data is generated by the image capturing apparatus C. On the other hand, in the third embodiment, captured image data before being encoded is transmitted from the image capturing apparatus C and the history data is generated by the mobile terminal SP.

Note that the block configurations of the image capturing apparatus C, the mobile terminal SP, and the server SV in the third embodiment are the same as those of the first embodiment. Therefore, the same components as those of the first embodiment are denoted by the same reference numerals, and redundant description thereof is omitted. However, in the third embodiment, a history processing neural network exists in the neural network processor 509 of the mobile terminal SP as the information processing apparatus.

Figure 10:
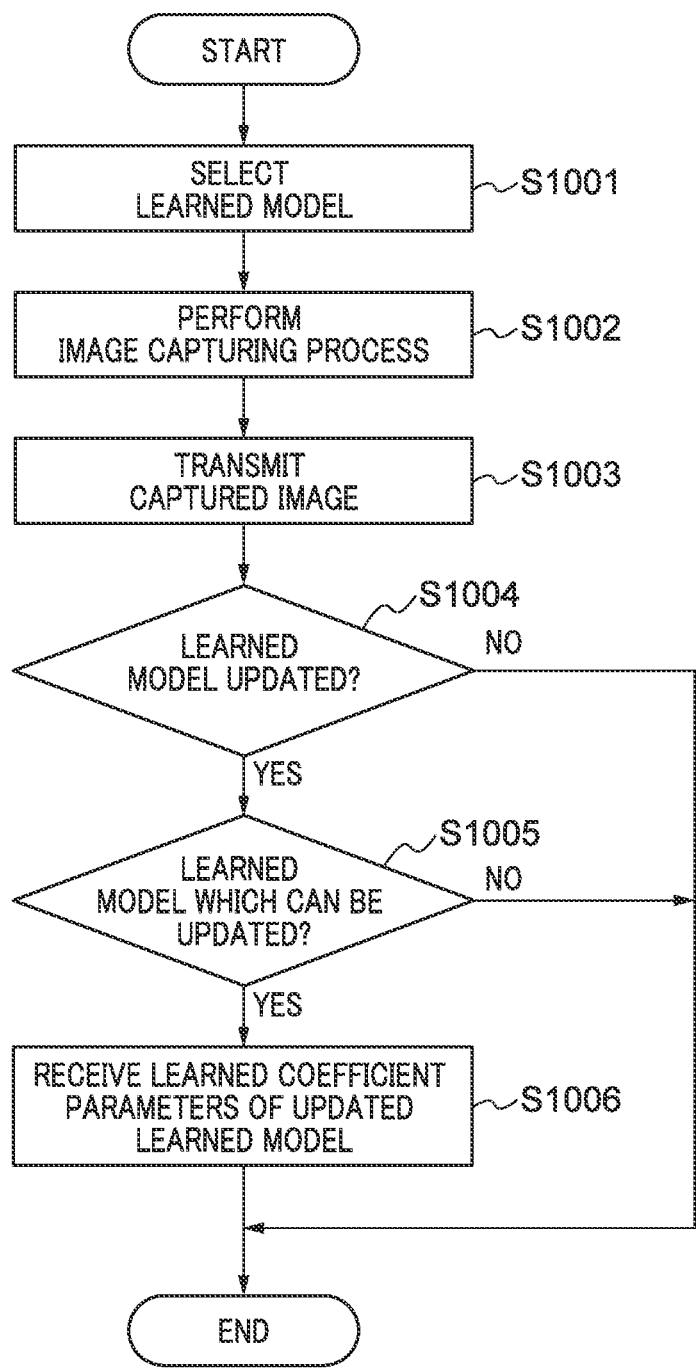
FIG. 10 is a flowchart of a learned model settings-changing process performed by an image capturing apparatus according to a third embodiment of the present invention.

FIG. 10 is a flowchart of a process performed by the image capturing apparatus C according to the third embodiment.

This process is realized, when the image capturing apparatus C is in the power-on state, by the CPU 201 loading the associated computer program stored in the nonvolatile memory 203 into the memory 202 and and executing the same.

Ina step S1001, the CPU 201 executes the same processing as in the step S601 and proceeds to a step S1002.

In the step S1002, the CPU 201 executes the same processing as in the step S602 and proceeds to a step S1003.

In the step S1003, the CPU 201 transmits the captured image data before being encoded which is stored in the memory 202 in the step S1002 and the image capturing information to the mobile terminal SP via the communication section 218 and proceeds to a step S1004.

In the step S1004, the CPU 201 transmits a request for checking whether or not the learned model has been updated, to the mobile terminal SP via the communication section 218. From a response to this request, if it is determined that the learned model has been updated (YES to the step S1004), the CPU 201 proceeds to a step S1005, whereas if it is determined that the learned model has not been updated (NO to the step S1004), the CPU 201 terminates the present process.

In the step S1005, when an inquiry about whether or not the updated learned model is a learned model which can be updated by the image capturing apparatus C is received from the mobile terminal SP via the communication section 218, the CPU 201 transmits a response to this inquiry to the mobile terminal SP. Specifically, first, the CPU 201 determines, based on the menu-based settings state held in the nonvolatile memory 203, whether or not the learned model associated with the high-priority object information included in the inquiry received from the mobile terminal SP is a learned model which can be updated. If it is determined, as a result, that the learned model in question is a learned model which can be updated (YES to the step S1005), the CPU 201 transmits this determination result to the mobile terminal SP and proceeds to a step S1006. On the other hand, if it is determined that the learned model in question is not a learned model which can be updated (NO to the step S1005), the CPU 201 transmits this determination result to the mobile terminal SP, followed by terminating the present process.

In the step S1006, the CPU 201 receives the learned coefficient parameters of the updated learned model from the mobile terminal SP via the communication section 218, followed by terminating the present process.

Figure 11:
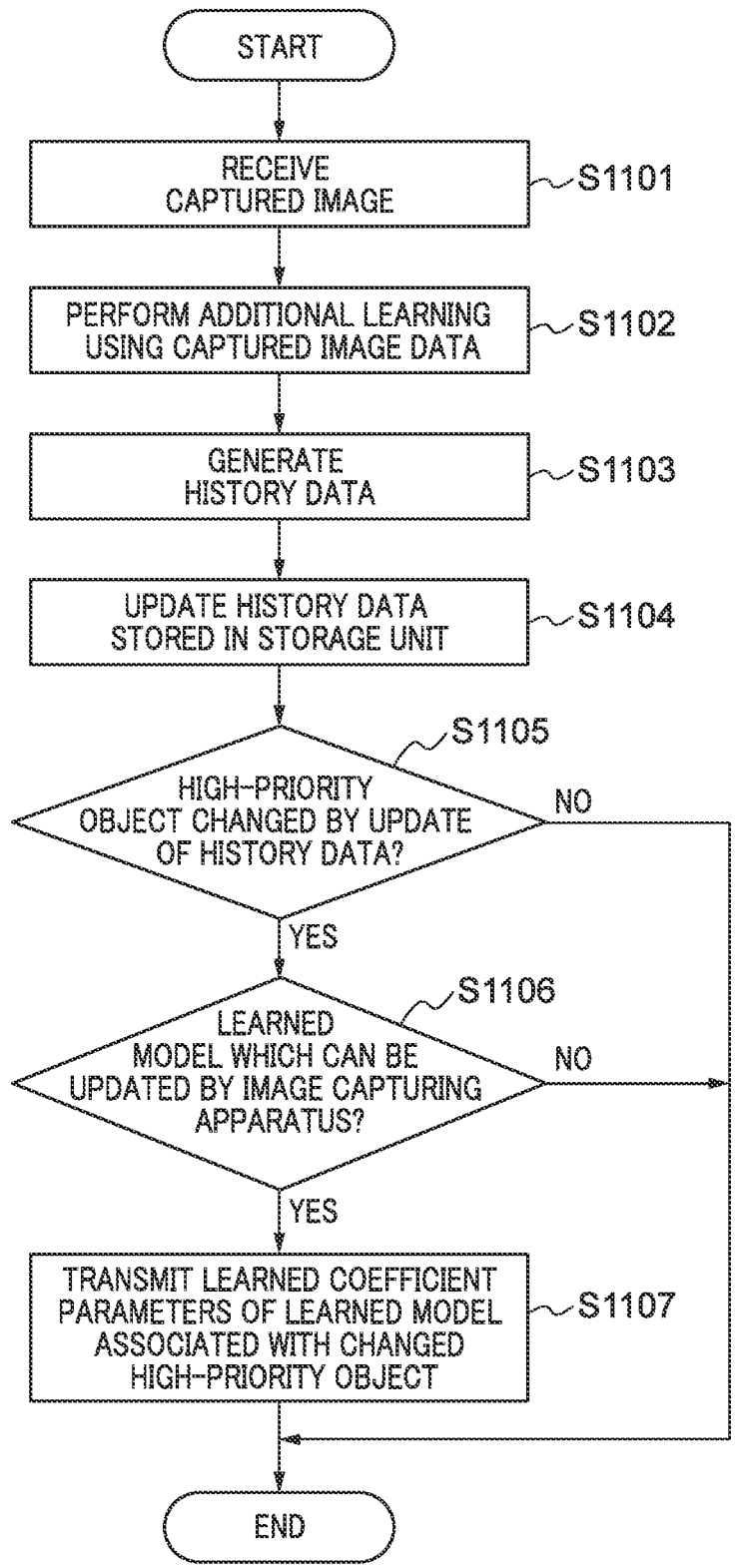
FIG. 11 is a flowchart of a learned model settings-changing process performed by a mobile terminal according to the third embodiment.

FIG. 11 is a flowchart of a learned model settings-changing process performed by the mobile terminal SP according to the third embodiment.

This process is realized, when the mobile terminal SP is in the power-on state, by the CPU 501 loading the associated computer program stored in the storage unit 506 into the memory 502 and executing the same.

In a step S1101, the CPU 501 receives a captured image data before being encoded and the image capturing information from the image capturing apparatus C via the communication section 507, stores them in the memory 502, and proceeds to a step S1102.

In the step S1102, the CPU 501 controls the neural network processor 509 to perform additional unsupervised learning. At this time, the captured image data before being encoded which is stored in the memory 502 is set as the input data, and a learned model associated with an object included in the input data, out of existing learned models stored in the storage unit 506, is used. For example, image data of fireworks is set as the input data and relearning of a learned model for fireworks is performed.

Note that in a case where additional supervised learning is performed, the CPU 501 transmits the captured image to the server SV via the communication section 507. The CPU 501 receives a result of processing performed by the neural network processor 408 of the server SV, using a high-performance learned model, from the server SV, as teacher data, via the communication section 507. Then, the CPU 501 stores a learned model newly generated by this additional learning in the storage unit 506. Specifically, the additional learning is performed in a state in which values of the learned coefficient parameters of the existing learned model are used as the initial values of the weight coefficients, the bias values, etc. Then, the CPU 501 proceeds to a step S1103.

In the step S1103, the CPU 501 generates history data. Specifically, the CPU 501, first, inputs the captured image data before being encoded which is stored in the memory 502 in the step S1101, to the neural network processor 509. With this, the CPU 501 causes the history processing neural network to output the classification of the main object as the history data, and proceeds to a step S1104. Note that not only the captured image, but also the image capturing information may be input to the neural network processor 509, and the classification of the shooting scene may also be output as the history data.

In the step S1104, the CPU 501 replaces the old history data stored in the storage unit 506 with the new history data stored in the memory 502 to update the history data and proceeds to a step S1105. Note that the old history data is used in the step S1105, and hence the CPU 501 saves the old history data in the memory 502. Note that if no old history data does exists, the CPU 501 stores the history data generated in the step S1103 into the storage unit 506, followed by terminating the present process.

In the step S1105, the CPU 501 executes the same processing as in the step S605. Specifically, the CPU 501 compares the new history data stored in the storage unit 506 with the history data before the update, which is stored in the memory 502, and determines whether or not the ranking of the shooting frequency has been changed by the update of the history data. If it is determined that the ranking of the shooting frequency, i.e. the priority of the object has been changed (YES to the step S1005), the CPU 501 transmits a response to the effect that the learned model has been updated, in response to the request transmitted from the image capturing apparatus C in the step S1004 in FIG. 10, and proceeds to a step S1106. On the other hand, if it is determined that the priority of the object has not been changed (NO to the step S1105), the CPU 501 terminates the present process. Note that the present process may be configured such that even in a case where the priority of the object has not been changed, if the learned coefficient parameters of the learned model associated with the current high-priority object have been updated by the additional learning in the step S1102, the CPU 501 proceeds to the step S1106. Further, in this case as well, the CPU 501 transmits a response to the effect that the learned model has been updated, in response to the request transmitted from the image capturing apparatus C in the step S1004 in FIG. 10.

In the step S1106, the CPU 501 changes the high-priority object to the object whose priority has become higher and determines whether or not the learned model associated with the high-priority object after the change is a learned model which can be updated by the image capturing apparatus C. Specifically, the CPU 501 transmits an inquiry about whether or not the learned model in question is a learned model which can be updated, to the image capturing apparatus C via the communication section 507, and performs this determination based on the response to this inquiry, which is received in the step S1005 in FIG. 10. If it is determined, as a result, that the learned model in question is a learned model which can be updated by the image capturing apparatus C (YES to the step S1106), the CPU 501 proceeds to a step S107. On the other hand, if the learned model in question is not a learned model which can be updated by the image capturing apparatus C (NO to the step S1106), the CPU 501 terminates the present process.

In the step S1107, the CPU 501 transmits the learned coefficient parameters of the learned model associated with the high-priority object after the change to the image capturing apparatus C via the communication section 507, followed by terminating the present process.

As described above, by performing the process according to the third embodiment, the mobile terminal SP is capable of performing additional learning of the existing learned model based on the received captured image data before being encoded. Further, the mobile terminal SP is capable of generating the history data, changing the learned model based on the generated history data, and transmitting the learned coefficient parameters of the changed learned model to the image capturing apparatus C.

As a learned model selection system according to a fourth embodiment of the present invention, a system 120 comprised of the image capturing apparatus C, and the server SV and the mobile terminal SP as the information processing apparatuses will be described in detail below, by way of example, with reference to accompanying drawings. However, the present invention is not limited to the fourth embodiment described below by way of example.

In the third embodiment, the history data and the learned model are generated by the mobile terminal SP. On the other hand, in the fourth embodiment, the history data and the learned model are generated by the server SV.

Note that the block configurations of the image capturing apparatus C, the server SV, and the mobile terminal SP in the fourth embodiment are the same as those of the first embodiment. Therefore, the same components as those of the first embodiment are denoted by the same reference numerals and redundant description thereof is omitted. However, in the fourth embodiment, a history processing neural network exists in the neural network processor 408 of the server SV as the information processing apparatus.

Figure 12:
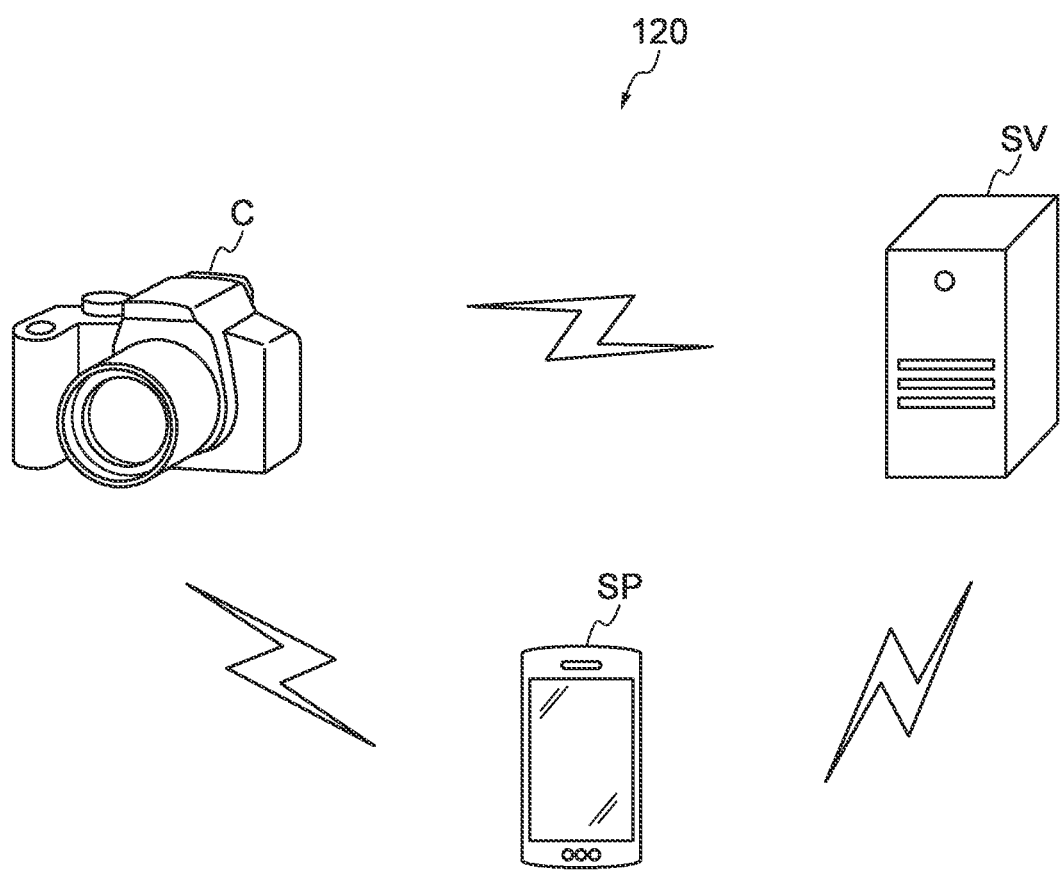
FIG. 12 is a system configuration diagram of a learned model selection system according to a fourth embodiment of the present invention.

FIG. 12 is a system configuration diagram of the system 120.

As shown in FIG. 12, the image capturing apparatus C, the server SV, and the mobile terminal SP are interconnected by a wireless communication network (or a wired communication network, not shown).

A flowchart of a process performed by the image capturing apparatus C according to the fourth embodiment is the same as the flowchart in FIG. 10 in the third embodiment.

Figure 13:
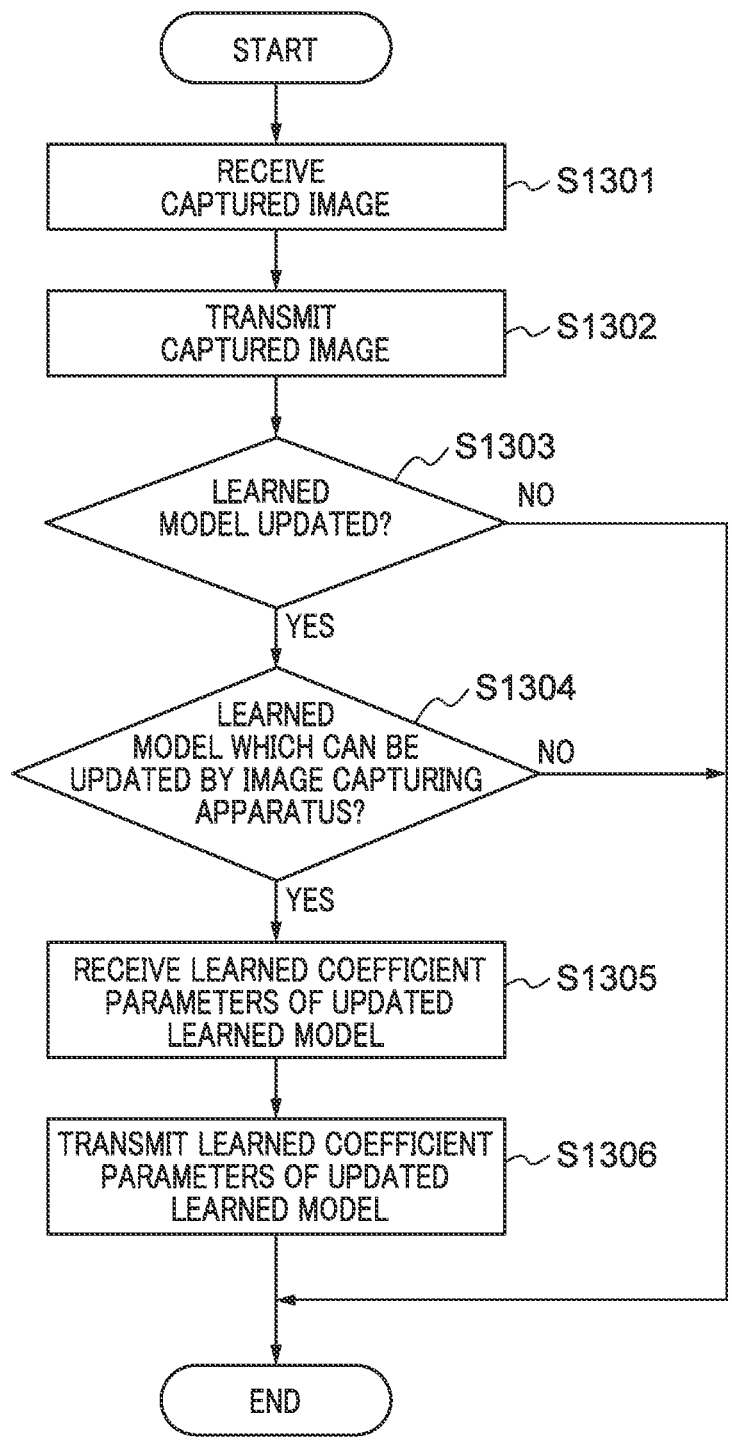
FIG. 13 is a flowchart of a learned model settings-changing process performed by a mobile terminal according to the fourth embodiment.

FIG. 13 is a flowchart of a learned model settings-changing process performed by the mobile terminal SP according to the fourth embodiment.

This process is realized, when the mobile terminal SP is in the power-on state, by the CPU 501 loading the associated computer program stored in the storage unit 506 into the memory 502 and executing the same.

In a step S1301, the CPU 501 executes the same processing as in the step S1101 and proceeds to a step S1302.

In the step S1302, the CPU 501 transmits the captured image data before being encoded and the image capturing information, received in the step S1301, to the server SV via the communication section 507 and proceeds to a step S1303.

In the step S1303, in a case where a request for checking whether or not the learned model has been updated is received from the image capturing apparatus C in the step S1004 in FIG. 10, the CPU 501 transmits an inquiry about whether or not the learned model has been updated, to the server SV via the communication section 507. As a result of this inquiry, if it is determined that the learned model has been updated (YES to the step S1303), the CPU 501 proceeds to a step S1304, whereas if it is determined that the learned model has not been updated (NO to the step S1303), the CPU 501 terminates the present process.

In the step S1304, the CPU 501 waits for an inquiry from the server SV about whether or not the updated learned model is a learned model which can be updated by the image capturing apparatus C via the communication section 507. When this inquiry is received from the server SV, the CPU 501 transfers the received inquiry to the image capturing apparatus C via the communication section 507. Then, as the response transmitted in the step S1005 in FIG. 10, if a response to the effect that the updated learned model is a learned model which can be updated by the image capturing apparatus C is received, the CPU 501 transfers this response to the server SV (YES to the step S1304) and proceeds to a step S1305. On the other hand, as the response transmitted in the step S1005 in FIG. 10, if a response to the effect that the updated learned model is not a learned model which can be updated by the image capturing apparatus C is received, the CPU 501 transfers this response to the server SV (NO to the step S304), followed by terminating the present process.

In the step S1305, the CPU 501 receives learned coefficient parameters of the learned model from the server SV via the communication section 507, stores the received learned coefficient parameters in the memory 502, and proceeds to a step S1306.

In the step S1306, the CPU 501 transmits the learned coefficient parameters of the learned model, which are stored in the memory 502, to the image capturing apparatus C via the communication section 507, followed by terminating the present process.

Figure 14:
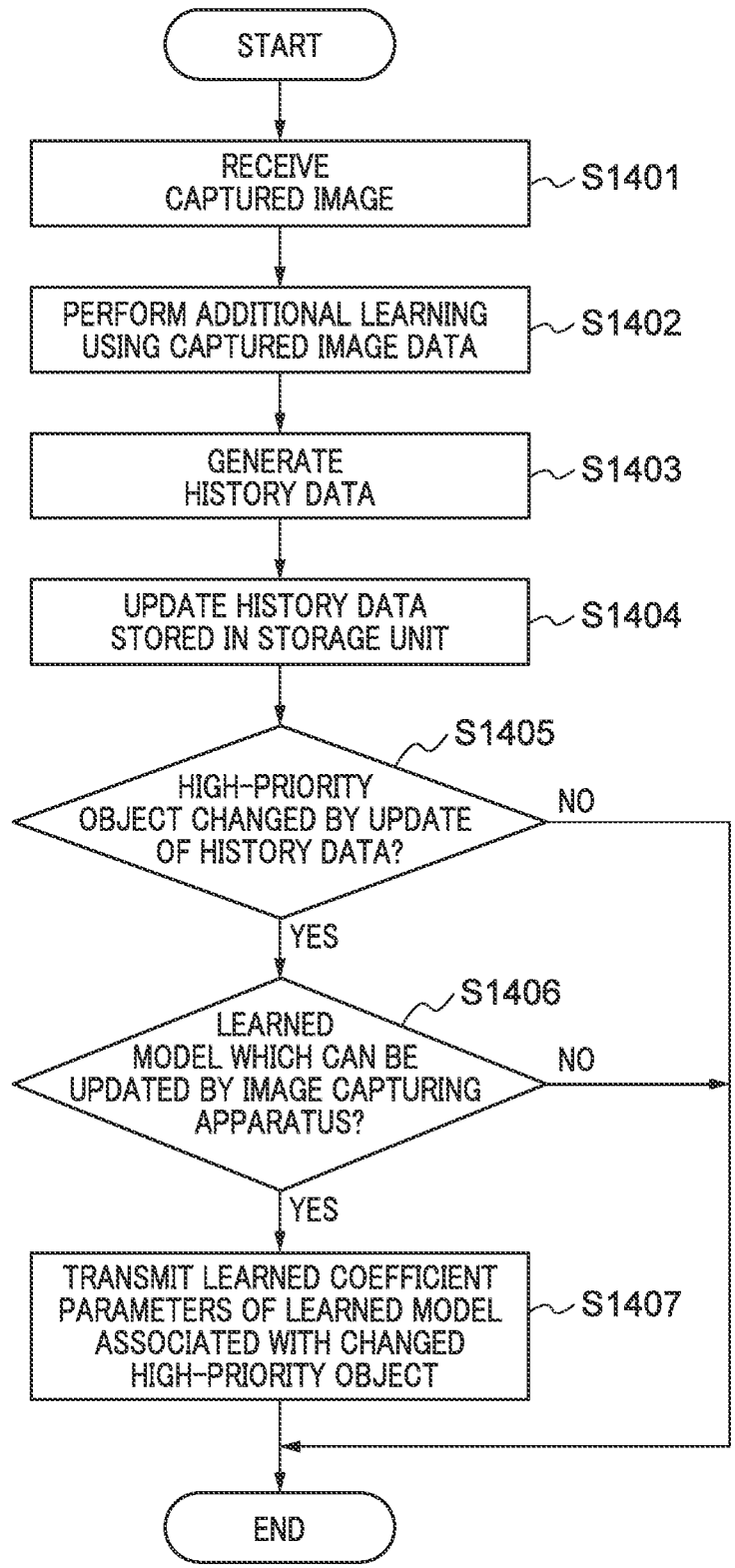
FIG. 14 is a flowchart of a learned model settings-changing process performed by a server according to the fourth embodiment.

FIG. 14 is a flowchart of a learned model settings-changing process performed by the server SV according to the fourth embodiment.

This process is realized, when the server SV is in a power-on state, by the CPU 401 loading the associated computer program stored in the storage unit 406 into the memory 402 and executing the same.

In a step S1401, the CPU 401 receives the image data before being encoded and the image capturing information, which are transmitted from the mobile terminal SP in the step S302 in FIG. 13, via the communication section 407, stores them in the memory 402, and proceeds to a step S1402.

In the step S1402, the CPU 401 causes the neural network processor 408 to perform additional learning. At this time, the CPU 401 sets the captured image data before being encoded which is stored in the memory 402, as the input data, and uses the existing learned model associated with the input data, which is stored in the storage unit 406. Then, the CPU 401 stores a learned model newly generated by this additional learning in the storage unit 406. Specifically, the additional learning is performed in a state in which values of the learned coefficient parameters of the existing learned model are used as the initial values of the weight coefficients, the bias values, etc. This processing is the same as in the step S1102 in FIG. 11. Then, the CPU 401 proceeds to a step S1403.

In the step S1403, the CPU 401 generates history data. Specifically, the CPU 401, first, inputs the captured image data before being encoded which is stored in the memory 402 in the step S1401, to the neural network processor 408. Then, the CPU 401 causes the history processing neural network to output the classification of the main object as the history data and proceeds to a step S144. Note that not only the captured image, but also the image capturing information may be input to the neural network processor 408, and the classification of the shooting scene may also be output as the history data.

In the step S1404, the CPU 401 replaces the old history data stored in the storage unit 406 with the new history data stored in the memory 402 to thereby update the history data, and proceeds to a step S1405. Note that the old history data is used in the step S1405, and hence the CPU 401 saves the old history data in the memory 402. If no old history data exists, the CPU 401 stores the history data generated in the step S1403 into the storage unit 406, followed by terminating the present process.

In the step S1405, the CPU 401 executes the same processing as in the step S605. Specifically, the CPU 401 compares the new history data stored in the storage unit 406 with the history data before the update, which is stored in the memory 402, and determines whether or not the ranking of the shooting frequency has been changed by the update of the history data. If it is determined that the ranking of the shooting frequency. i.e. the priority of the object has been changed (YES to the step S1405), the CPU 401 transmits a response to the effect that the learned model has been updated in response to the inquiry received from the mobile terminal SP in the step S1303 in FIG. 13 and proceeds to a step S1406. On the other hand, if it is determined that the priority of the object has not been changed (NO to the step S1405), the CPU 401 terminates the present process. Note that the present process may be configured such that even in a case where the priority of the object has not been changed, if the learned coefficient parameters of the learned model associated with the current high-priority object have been updated by the additional learning in the step S1402, the CPU 401 proceeds to the step S1406. Further, in this case as well, the CPU 401 transmits a response to the effect that the learned model has been updated, in response to the inquiry received from the mobile terminal SP in the step S1303 in FIG. 13.

In the step S1406, the CPU 401 changes the high-priority object to the object whose priority has become higher, and determines whether or not the learned model associated with the high-priority object after the change is a learned model which can be updated by the image capturing apparatus C. Specifically, this determination is performed as follows: First, the CPU 401 transmits an inquiry about whether or not the learned model in question is a learned model which can be updated by the image capturing apparatus C, to the mobile terminal SP via the communication section 407. Then, in response to this inquiry, the mobile terminal SP transfers the contents of the response from the image capturing apparatus C to the server SV in the step S1304 in FIG. 13. The determination of whether or not the learned model in question is a learned model which can be updated by the image capturing apparatus C is performed based on the contents of the response received from the mobile terminal SP. If it is determined, as a result, that the learned model in question is a learned model which can be updated by the image capturing apparatus C (YES to the step S1406), the CPU 401 proceeds to a step S1407. On the other hand, if the learned model in question is not a learned model which can be updated by the image capturing apparatus C (NO to the step S1406), the CPU 401 terminates the present process.

In the step S1407, the CPU 401 transmits learned coefficient parameters of the learned model associated with the high-priority object after the change to the mobile terminal SP via the communication section 407, followed by terminating the present process.

As described above, by performing the process according to the fourth embodiment, the server SV is capable of performing additional learning of the existing learned model based on the received captured image data before being encoded. Further, the server SV is capable of generating the history data, changing the learned model based on the generated history data, and transmitting the learned coefficient parameters of the changed learned model to the image capturing apparatus C.

Note that although in the fourth embodiment, the server SV generates the history data and performs the additional learning of the existing learned model, the present invention is not limited to this form. For example, one of the mobile terminal SP and the server SV may generate history data, and the other of them may perform the additional learning of the existing learned model.

The present invention has been described heretofore based on the embodiments thereof. However, the present invention is not limited to these embodiments, but it is to be understood that the invention includes various forms within the scope of the gist of the present invention.

The target to which the present invention is applied is not limited to the image capturing apparatus C, the server SV, the mobile terminal SP, etc. described in the embodiments. For example, even in a case where the image capturing apparatus C is configured as a system formed by a plurality of apparatuses, it is possible to realize he same functions as those of the above-described embodiments. Further, the functions can also be realized by causing an external apparatus on the network to execute part of the process performed by the image capturing apparatus C.

Further, the neural network processors 205, 408, and 509 are only required to be processors configured to be operated according to an algorithm for machine learning, and the algorithm is not limited to the neural network. For example, an algorithm, such as SVM (support vector machine) and a decision tree, may be used.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-221408 filed Dec. 6, 2019, which is hereby incorporated by reference herein in its entirety.

What is claimed is:

1. An image capturing apparatus comprising:
an image capturing unit configured to generate a captured image by capturing an image of an object;
a communication unit configured to communicate with an information processing apparatus that stores first learned models associated with a plurality of classes, respectively;
a learned model execution unit configured to execute processing on the captured image using one of the first learned models which is associated with a high-priority class which is one of the plurality of classes;
a history data generation unit configured to generate history data based on at least one of the captured image and image capturing information at the time of capturing the image;
an acquisition unit configured to acquire learned coefficient parameters of one of the first learned models which is associated with another class of the plurality of classes, from the information processing apparatus via the communication unit, based on the generated history data; and
a change unit configured to change settings of the one of the first learned models which is used by the learned model execution unit, based on the acquired learned coefficient parameters.

2. The image capturing apparatus according to claim 1, further comprising a classification unit configured to execute classification processing for classifying at least one information of a main object of the captured image and a shooting scene of the same into one of the plurality of classes, and
wherein the history data includes information indicating into which of the plurality of classes the at least one information is classified by the classification unit.

3. The image capturing apparatus according to claim 2, wherein the classification unit executes the classification processing using a second learned model used for classification.

4. The image capturing apparatus according to claim 2, wherein the history data further holds information on ranking of a shooting frequency of each of the plurality of classes, and
wherein the learned coefficient parameters acquired by the acquisition unit are learned coefficient parameters of one of the first learned models which is associated with a class whose ranking of the shooting frequency has become higher in the history data.

5. The image capturing apparatus according to claim 4, further comprising an update unit configured to update, in a case where there is a class whose ranking of the shooting frequency has become higher in the history data, the high-priority class to the class, and
wherein the learned coefficient parameters acquired by the acquisition unit are learned coefficient parameters of one of the first learned models which is associated with the updated high-priority class.

6. The image capturing apparatus according to claim 5, further comprising a selection unit configured to select whether or not to enable the update of the high-priority class by the update unit, according to a user's operation.

7. The image capturing apparatus according to claim 5, further comprising a display unit configured to display the plurality of classes, and
a selection unit configured to select, for each of the plurality of displayed classes, whether or not to enable the update thereof as the high-priority class by the update unit, according to a user's operation.

8. The image capturing apparatus according to claim 7, wherein the display unit displays the plurality of classes in decreasing order of ranking of the shooting frequency of each class.

9. The image capturing apparatus according to claim 1, wherein the history data generated by the history data generation unit is transmitted to the information processing apparatus via the communication unit.

10. The image capturing apparatus according to claim 1, wherein the history data generation unit transmits the captured image and the image capturing information at the time of capturing the image to the information processing apparatus via the communication unit, and causes the information processing apparatus to generate the history data based on the at least one of the captured image and the image capturing information at the time of capturing the image which are transmitted thereto.

11. The image capturing apparatus according to claim 1, wherein the history data generation unit newly generates the history data whenever image capturing is performed by the image capturing unit.

12. The image capturing apparatus according to claim 1, wherein the processing on the captured image includes at least one of object detection, boundary classification, image processing, and noise reduction.

13. The image capturing apparatus according to claim 1, wherein the at least one information is generated from the at least one of the captured image and the image capturing information at the time of capturing the image.

14. The image capturing apparatus according to claim 13, wherein the at least one information further includes at least one of GPS information and weather information.

15. An information processing apparatus comprising:
a learned model storage unit configured to store first learned models associated with a plurality of classes, respectively;
a communication unit configured to communicate with an image capturing apparatus that generates a captured image by capturing an image of an object and performs processing on the captured image using one of the first learned models which is associated with a high-priority class which is one of the plurality of classes;
a first reception unit configured to receive the captured image and image capturing information at the time of capturing the image from the image capturing apparatus via the communication unit;
a history data generation unit configured to generate history data based on at least one of the received captured image and image capturing information at the time of capturing the image; and
a transmission unit configured to transmit learned coefficient parameters of one of the first learned models which is associated with another class of the plurality of classes to the image capturing apparatus via the communication unit, based on the history data generated by the history data generation unit.

16. The information processing apparatus according to claim 15, further comprising a classification unit configured to execute classification processing for classifying at least one information of a main object of the received captured image and a shooting scene of the same into one of the plurality of classes, and
wherein the history data includes information indicating into which of the plurality of classes the at least one information is classified by the classification unit.

17. The information processing apparatus according to claim 16, wherein the classification unit executes the classification processing using a second learned model used for classification.

18. The information processing apparatus according to claim 16, wherein the history data further holds information on ranking of a shooting frequency of each of the plurality of classes, and
wherein the learned coefficient parameters transmitted by the transmission unit are learned coefficient parameters of one of the first learned models which is associated with a class whose ranking of the shooting frequency has become higher in the history data.

19. The information processing apparatus according to claim 15, wherein the communication unit further communicates with another information processing apparatus that communicates with the image capturing apparatus,
the information processing apparatus further comprising a second reception unit configured to receive the captured image and image capturing information at the time capturing the image via the other information processing apparatus via the communication unit, and
a learning unit configured to perform learning for building learned models associated with the plurality of classes, respectively, and
wherein the learning unit performs the learning using the captured image received by at least one of the first and second reception units.

20. A learned model selection system including:
an image capturing apparatus that generates a captured image by capturing an image of an object, and
an information processing apparatus that stores first learned models associated with a plurality of classes, respectively,
wherein the image capturing apparatus comprises:
a learned model execution unit configured to execute processing on the captured image using one of the first learned models which is associated with a high-priority class which is one of the plurality of classes; and
a first transmission unit configured to transmit the captured image and image capturing information at the time of capturing the image to the information processing apparatus,
wherein the information processing apparatus comprises:
a history data generation unit configured to generate history data based on at least one of the captured image and the image capturing information at the time of capturing the image which are transmitted from the image capturing apparatus; and
a second transmission unit configured to transmit learned coefficient parameters of one of the first learned models which is associated with another class of the plurality of classes to the image capturing apparatus, based on the generated history data,
the image capturing apparatus further comprising a change unit configured to change settings of the one of the first learned models which is used by the learned model execution unit, based on the learned coefficient parameters transmitted from the information processing apparatus.

21. The learned model selection system according to claim 20, wherein the information processing apparatus further comprises a learning unit configured to perform learning for building learned models associated with the plurality of classes, respectively, and
wherein the learning unit performs the learning using at least one of the captured image transmitted from another information processing apparatus that communicates with the image capturing apparatus and the captured image transmitted from the image capturing apparatus.

22. The learned model selection system according to claim 20, wherein the first transmission unit transmits, whenever the captured image is newly generated by image capturing performed by the image capturing apparatus, the generated captured image.

23. A learned model selection system including:
an image capturing apparatus that generates a captured image by capturing an image of an object,
a first information processing apparatus, and
a second information processing apparatus that stores first learned models associated with a plurality of classes, respectively,
wherein the image capturing apparatus comprises:
a learned model execution unit configured to execute processing on the captured image using one of the first learned models which is associated with a high-priority class which is one of the plurality of classes; and
a first transmission unit configured to transmit the captured image and image capturing information at the time of capturing the image to the first information processing apparatus,
wherein the first information processing apparatus comprises:
a history data generation unit configured to generate history data based on at least one of the captured image and the image capturing information at the time of capturing the image which are transmitted from the image capturing apparatus;

an update unit configured to update the high-priority class to another class of the plurality of classes based on the generated history data;

an acquisition unit configured to acquire learned coefficient parameters of one of the first learned models which is associated with the updated high-priority class, from the second information processing apparatus; and a second transmission unit configured to transmit the acquired learned coefficient parameters to the image capturing apparatus, the image capturing apparatus further comprising a change unit configured to change settings of the one of the first learned models which is used by the learned model execution unit, based on the learned coefficient parameters transmitted from the first information processing apparatus.

24. The learned model selection system according to claim 23, wherein the second information processing apparatus includes a learning unit configured to perform learning for building learned models associated with the plurality of classes, respectively, and wherein the learning unit performs the learning using the captured image received from the first information processing apparatus.

25. A method of controlling an image capturing apparatus that communicates with an information processing apparatus storing first learned models associated with a plurality of classes, respectively, comprising:

generating a captured image by capturing an image of an object;

executing processing on the captured image using one of the first learned models which is associated with a high-priority class which is one of the plurality of classes;

generating history data based on at least one of the captured image and image capturing information at the time of capturing the image;

acquiring learned coefficient parameters of the first learned model associated with another class of the plurality of classes, from the information processing apparatus, based on the generated history data; and changing settings of the one of the first learned models which is used for execution of the processing on the captured image, based on the acquired learned coefficient parameters.

26. A method of controlling an information processing apparatus that communicates with an image capturing apparatus that generates a captured image by capturing an image of an object and performs processing on the captured image using a first learned model associated with a high-priority class which is one of a plurality of classes, comprising:

storing first learned models associated with the plurality of classes, respectively;

receiving the captured image and image capturing information at the time of capturing the image from the image capturing apparatus;

generating history data based on at least one of the received captured image and image capturing information at the time of capturing the image; and transmitting learned coefficient parameters of one of the first learned models which is associated with another class of the plurality of classes, to the image capturing apparatus, based on the generated history data.

27. A non-transitory computer-readable storage medium storing a computer-executable program for executing a method of controlling an image capturing apparatus that communicates with an information processing apparatus storing first learned models associated with a plurality of classes, respectively, wherein the method comprises:

generating a captured image by capturing an image of an object;

executing processing on the captured image using one of the first learned models which is associated with a high-priority class which is one of the plurality of classes;

generating history data based on at least one of the captured image and image capturing information at the time of capturing the image;

acquiring learned coefficient parameters of the first learned model associated with another class of the plurality of classes, from the information processing apparatus, based on the generated history data; and changing settings of the one of the first learned models which is used for execution of the processing on the captured image, based on the acquired learned coefficient parameters.

28. A non-transitory computer-readable storage medium storing a computer-executable program for executing a method of controlling an information processing apparatus that communicates with an image capturing apparatus that generates a captured image by capturing an image of an object and performs processing on the captured image using a first learned model associated with a high-priority class which is one of a plurality of classes, wherein the method comprises:

storing first learned models associated with the plurality of classes, respectively;

receiving the captured image and image capturing information at the time of capturing the image from the image capturing apparatus;

generating history data based on at least one of the received captured image and image capturing information at the time of capturing the image; and transmitting learned coefficient parameters of one of the first learned models which is associated with another class of the plurality of classes, to the image capturing apparatus, based on the generated history data.

* * * * *